United States Patent
Takazawa et al.

(10) Patent No.: US 10,775,622 B2
(45) Date of Patent: Sep. 15, 2020

(54) HEAD-UP DISPLAY DEVICE

(71) Applicant: DENSO CORPORATION, Kariya, Aichi-pref. (JP)

(72) Inventors: Takashi Takazawa, Kariya (JP); Taizo Miyato, Kariya (JP); Yuichiro Hayakawa, Kariya (JP); Kazuyuki Ishihara, Kariya (JP); Makoto Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/563,168

(22) Filed: Sep. 6, 2019

(65) Prior Publication Data

US 2019/0391389 A1    Dec. 26, 2019

Related U.S. Application Data

(63) Continuation of application No. PCT/JP2018/009845, filed on Mar. 14, 2018.

(30) Foreign Application Priority Data

Apr. 5, 2017    (JP) .................................. 2017-075414

(51) Int. Cl.
*G02B 27/01*    (2006.01)
*G01C 21/36*    (2006.01)
(Continued)

(52) U.S. Cl.
CPC ............ *G02B 27/0101* (2013.01); *B60R 1/00* (2013.01); *G01C 21/365* (2013.01); *G02B 26/10* (2013.01);
(Continued)

(58) Field of Classification Search
CPC ................ G02B 27/0101; G02B 26/10; G02B 2027/014; G02B 27/01; G01C 21/365;
(Continued)

(56) References Cited

U.S. PATENT DOCUMENTS

| 2015/0268466 A1* | 9/2015 | Kanamori | ............... | G09G 3/025 |
| | | | | 345/8 |
| 2015/0331239 A1* | 11/2015 | Ando | ..................... | G02B 26/10 |
| | | | | 359/631 |

FOREIGN PATENT DOCUMENTS

| JP | 2014010409 A | | 1/2014 | | |
| JP | 2015169691 A | * | 9/2015 | ............. | B60K 35/00 |

(Continued)

*Primary Examiner* — Abhishek Sarma
(74) *Attorney, Agent, or Firm* — Harness, Dickey & Pierce, P.L.C.

(57) ABSTRACT

A head-up display device includes: a screen having a display area to which light is projected to image a virtual image; an outer housing that holds the screen; a scanner unit having a scanner oscillating about a virtual scanning axis to draw a display image in the display area by scanning of the scanner; and a scanner housing held by the outer housing and holding the scanner unit. The outer housing and the scanner housing have an adjustment structure to enable an adjustment of an emission direction of light emitted from the scanner housing at least around the scanning axis by a relative rotation of the scanner housing with respect to the outer housing about a virtual adjustment axis intersecting the scanner unit.

13 Claims, 18 Drawing Sheets

(51) Int. Cl.
*G02B 26/10* (2006.01)
*B60R 1/00* (2006.01)

(52) U.S. Cl.
CPC .. *B60R 2300/205* (2013.01); *G02B 2027/014* (2013.01)

(58) Field of Classification Search
CPC ..... B60R 1/00; B60R 2300/205; B60K 35/00; H04N 5/74
See application file for complete search history.

(56) References Cited

FOREIGN PATENT DOCUMENTS

JP  2016224377 A * 12/2016
WO  WO-2013145155 A1 * 10/2013  ........... H04N 9/3135

* cited by examiner

US 10,775,622 B2

HEAD-UP DISPLAY DEVICE

CROSS REFERENCE TO RELATED APPLICATION

The present application is a continuation application of International Patent Application No. PCT/JP2018/009845 filed on Mar. 14, 2018, which designated the U.S. and claims the benefit of priority from Japanese Patent Application No. 2017-75414 filed on Apr. 5, 2017. The entire disclosures of all of the above applications are incorporated herein by reference.

TECHNICAL FIELD

The disclosure of this specification relates to a head-up display device that displays a virtual image for a viewer.

BACKGROUND ART

Conventionally, a head-up display device (hereinafter, "HUD device") is known which causes a viewer such as a driver to visually recognize a virtual image by projecting light onto a windshield of a vehicle.

SUMMARY

In one aspect of the present disclosure, a head-up display device that displays a virtual image for a viewer by projecting light onto a projection member includes: a screen having a display area to which light is projected to form the virtual image; an outer housing that holds the screen; a scanner unit having a scanner oscillating about a virtual scanning axis to draw a display image in the display area by scanning of the scanner; and a scanner housing held by the outer housing and holding the scanner unit. The outer housing and the scanner housing have an adjustment structure to enable an adjustment of an emission direction of light emitted from the scanner housing at least around the scanning axis by a relative rotation of the scanner housing with respect to the outer housing about a virtual adjustment axis, and the virtual adjustment axis intersects the scanner unit.

DESCRIPTION OF EMBODIMENTS

Figure 1:
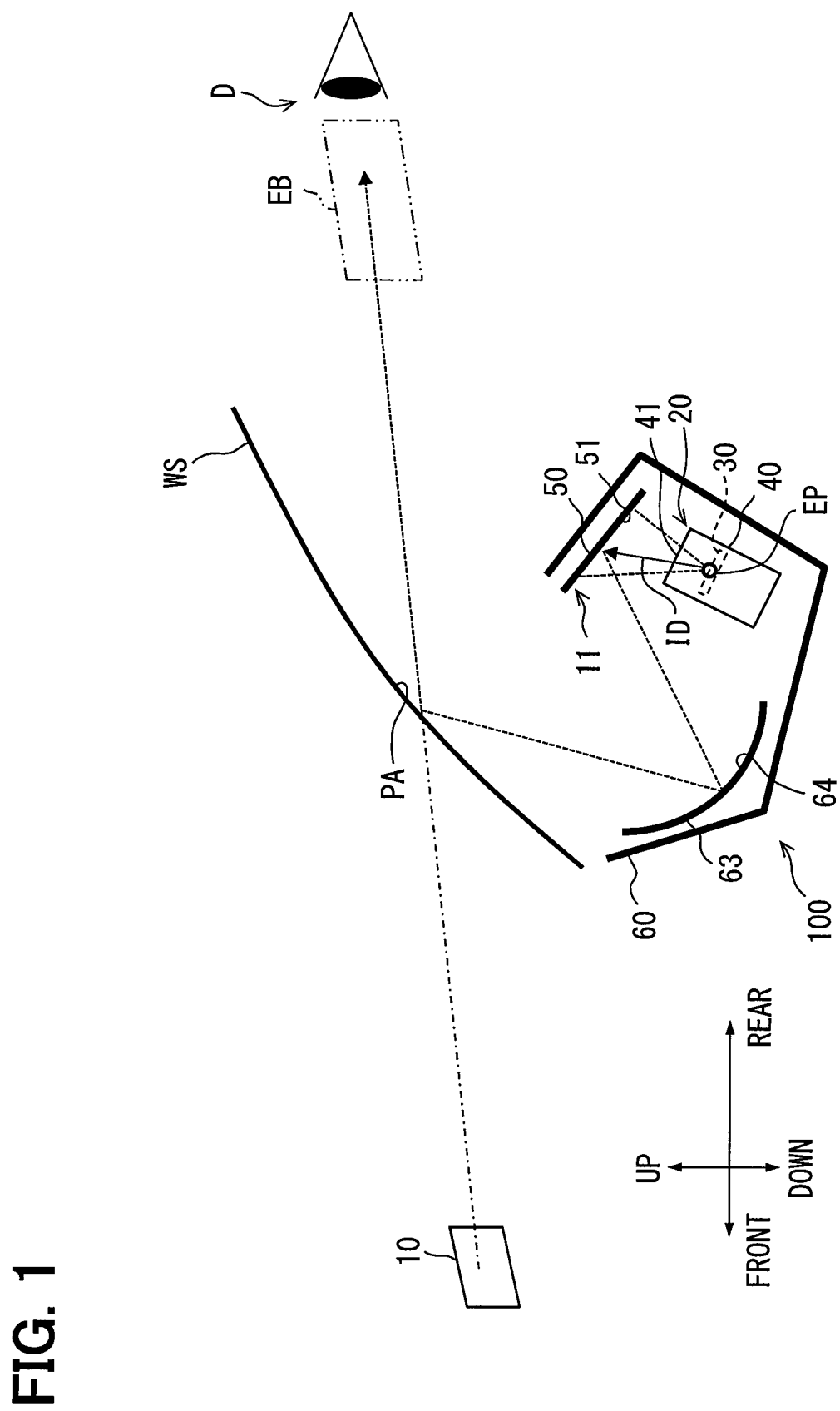
FIG. 1 is a schematic view showing a configuration of a HUD device according to a first embodiment.

A HUD device includes an optical scanning unit such as a two-dimensional modulation element. The optical scanning unit draws an image on an intermediate screen by scanning of laser light.

Variations occur unavoidably in the emission direction of the laser light emitted from the optical scanning unit toward the intermediate screen. As the assumed variation in the emission direction is larger, a scanner of the optical scanning unit has to scan a wider range than the display area originally required for a display of virtual image. The increase in the scanning angle of the scanner reduces the brightness of the virtual image. Therefore, there has been a demand for a structure to adjust the emission direction of the laser light in the correct direction in order to reduce the scan amount out of the display area.

However, when adjusting the emission direction, if the position of the scanner in the HUD device is easily moved, the relative optical position between the scanner and the intermediate screen also changes. If the position of the scanner is deviated, a large deviation may occur in the range where the viewer can view the virtual image.

The present disclosure provides a HUD device capable of narrowing a scanning angle of a scanner while maintaining a visible range of a virtual image.

In one aspect of the present disclosure, a head-up display device that displays a virtual image for a viewer by projecting light onto a projection member includes: a screen having a display area to which light is projected to form the virtual image; an outer housing that holds the screen; a scanner unit having a scanner oscillating about a virtual scanning axis to draw a display image in the display area by scanning of the scanner; and a scanner housing held by the outer housing and holding the scanner unit. The outer housing and the scanner housing have an adjustment structure to enable an adjustment of an emission direction of light emitted from the scanner housing at least around the scanning axis by a relative rotation of the scanner housing with respect to the outer housing about a virtual adjustment axis, and the virtual adjustment axis intersects the scanner unit.

According to the adjustment structure, the emission direction of the light emitted from the scanner housing can be controlled in the correct direction by rotating the scanner housing relative to the outer housing so as to reduce the scan amount out of the display area. In addition, when the virtual adjustment axis of the adjustment structure intersects the scanner unit, a virtual exit pupil of the light emitted from the scanner housing can be located at or near the adjustment axis. Therefore, the relative optical position between the scanner and the screen is unlikely to change even when the scanner housing is rotated relative to the outer housing to adjust the emission direction. Accordingly, it is possible to narrow the scanning angle of the scanner while maintaining the visible range of the virtual image.

In one aspect of the present disclosure, a head-up display device that displays a virtual image for a viewer by projecting light onto a projection member includes: a screen having a display area to which light is projected to form the virtual image; an outer housing that holds the screen; a scanner unit having a scanner oscillating about a virtual scanning axis to draw a display image in the display area by scanning of the scanner; a scanner housing held by the outer housing and holding the scanner unit; and a reflective optical element held by the scanner housing to reflect light incident from the scanner toward outside of the scanner housing, the reflective optical element defining a position of each mirror image of the scanner unit and the scanning axis. The outer housing and the scanner housing have an adjustment structure to enable an adjustment of an emission direction of light emitted from the scanner housing at least around a mirror image of the scanning axis by a relative rotation of the scanner housing with respect to the outer housing about a virtual adjustment axis, and the virtual adjustment axis intersects a mirror image of the scanner unit.

According to the adjustment structure, the emission direction of the light emitted from the scanner housing is controlled in a correct direction by rotating the scanner housing relative to the outer housing, to reduce the scan amount out of the display area. In addition, since the virtual adjustment axis of the adjustment structure intersects the mirror image of the scanner unit, the virtual exit pupil of the light emitted from the scanner housing is near or at the mirror image of the adjustment axis. Therefore, even when the scanner housing is rotated relative to the outer housing to adjust the emission direction, the relative optical position between the scanner and the screen is unlikely to change. Accordingly, it is possible to narrow the scanning angle of the scanner while maintaining the visible range of the virtual image.

Hereinafter, various embodiments of the present disclosure will be described with reference to the drawings. In the following respective embodiments, corresponding structural elements are indicated by the same reference signs and may not be redundantly described in some cases. In a case where only a part of a structure is described in each of the following embodiments, the rest of the structure of the embodiment may be the same as that of previously described one or more of the embodiments. Besides the explicitly described combination(s) of structural components in each of the following embodiments, the structural components of different embodiments may be partially combined even though such a combination(s) is not explicitly explained as long as there is no problem. It should be understood that the unexplained combinations of the structural components recited in the following embodiments and modifications thereof are assumed to be disclosed in this description by the following explanation.

First Embodiment

The HUD device 100 according to the first embodiment of the present disclosure shown in FIG. 1 is mounted on a vehicle and provides various information related to the vehicle to the driver D of the vehicle. The HUD device 100 is disposed in front of the driver seat for the driver D, and is housed in the instrument panel of the vehicle. The HUD device 100 projects light of the display image 11 onto the projection area PA of the windshield WS. The light projected on the windshield WS is reflected by the projection area PA toward the driver D, and reaches a predetermined eye box EB located around the head of the driver D. The driver D with the eye point positioned in the eye box EB can see the light of the display image 11 as a virtual image 10 superimposed on the foreground scenery.

The virtual image 10 provides the driver D with, for example, vehicle state information such as the vehicle speed and the remaining amount of fuel, and navigation information such as route guidance. The virtual image 10 is imaged in a space of about 10 to 20 meters from the eye point in front of the vehicle. The virtual image 10 functions as an augmented reality (AR) display by being superimposed on the road surface for the driver D.

Figure 2:
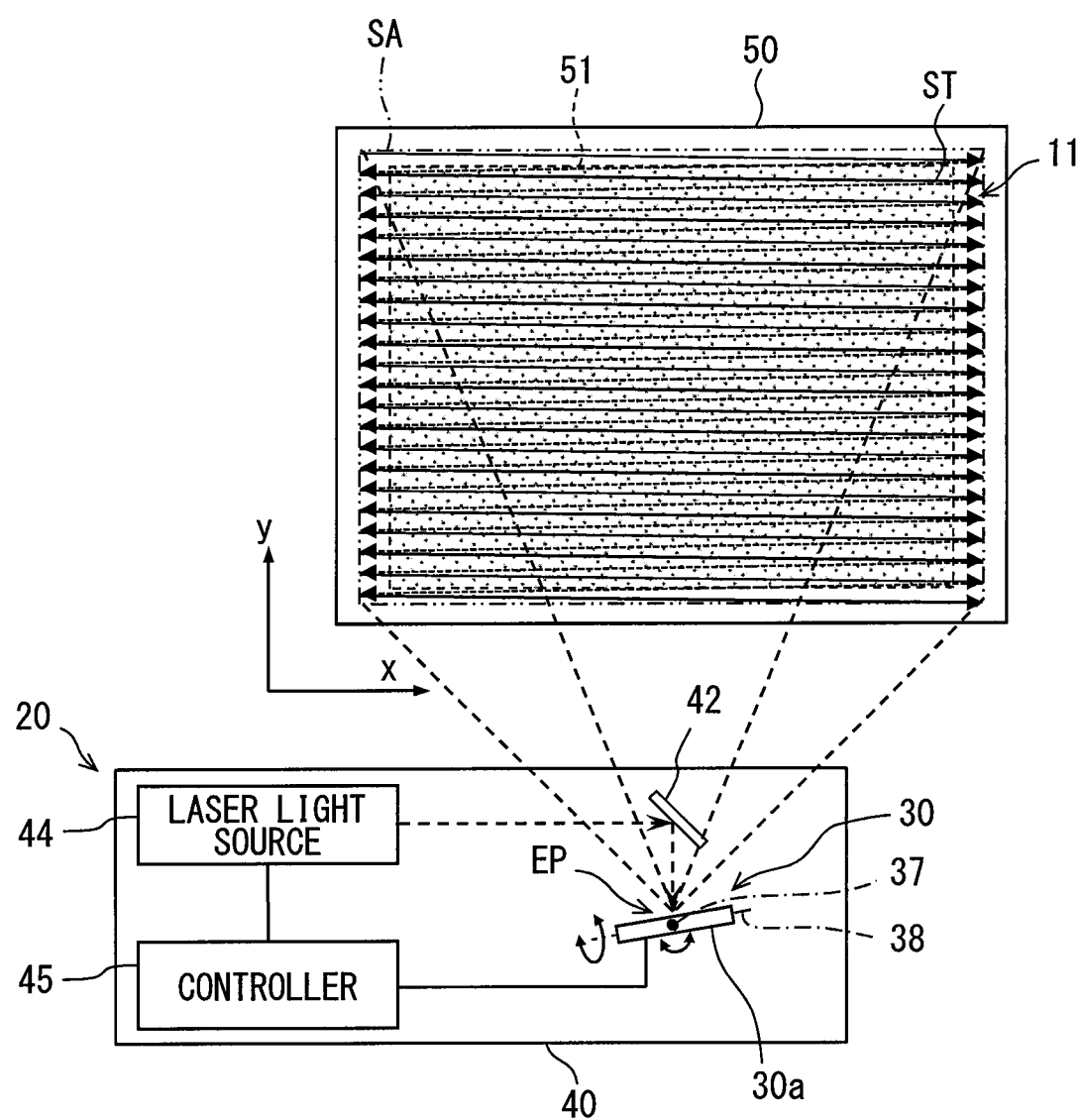
FIG. 2 is a schematic view showing a drawing of a display image by an optical scanning device.

As shown in FIGS. 1 and 2, the HUD device 100 includes an optical scanning device 20, a screen 50, a concave mirror 63, and a HUD housing 60.

The optical scanning device 20 is a laser projector that draws the display image 11 in a display area 51 defined on the screen 50 by light projected toward the screen 50. The optical scanning device 20 is disposed below the screen 50. The optical scanning device 20 causes the laser light emitted from the virtual exit pupil EP to be incident on the front side of the screen 50. The optical scanning device 20 includes a scanner unit 30, a laser light source 44, a reflecting mirror 42, a controller 45, and a scanner housing 40.

Figure 3:
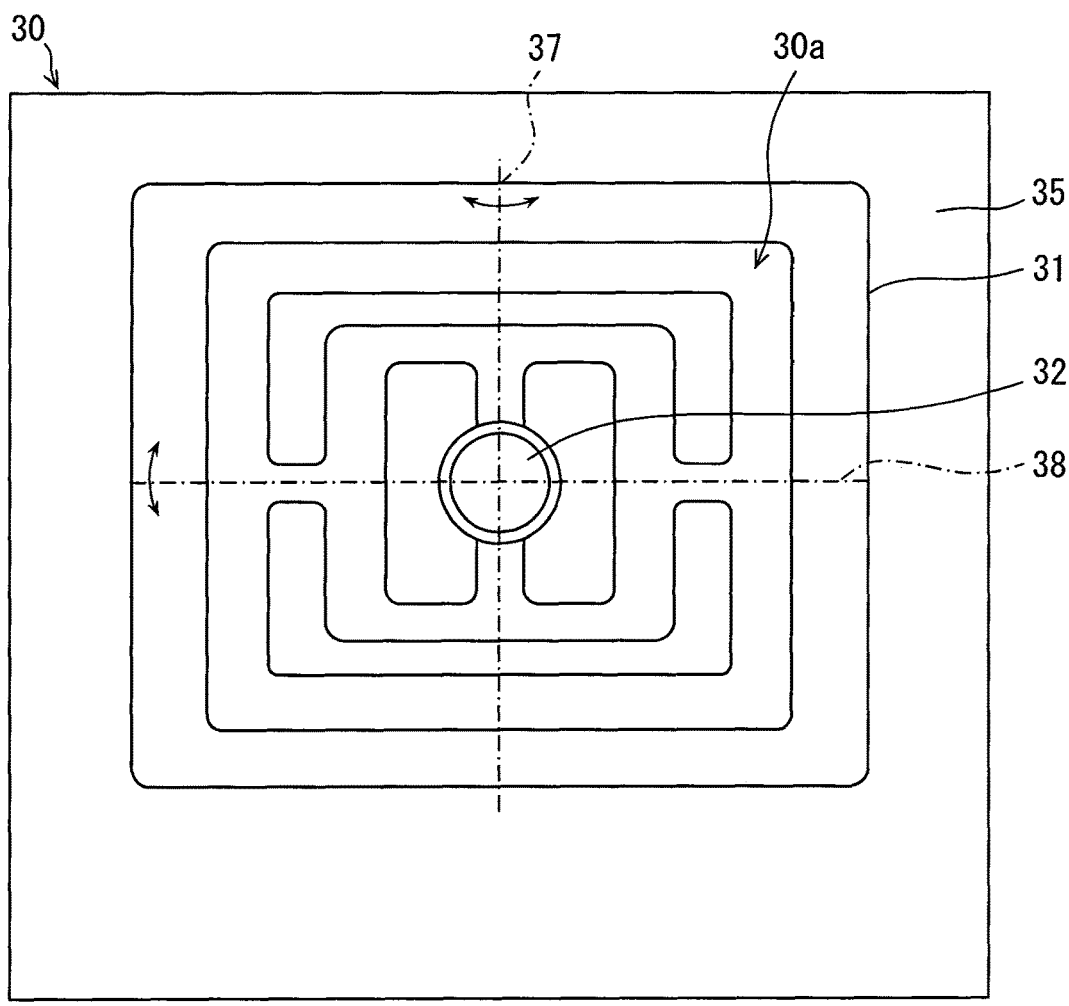
FIG. 3 is a diagram showing a configuration example of a scanner unit.

As shown in FIGS. 2 and 3, the scanner unit 30 has a scanner 30a. A resonant scanning axis 37 and a forced scanning axis 38 are defined in the scanner 30a, as virtual scanning axes. The scanning center of the optical scanning device 20 is a virtual intersection of the resonant scanning axis 37 and the forced scanning axis 38. The scanner unit 30 includes a micro electro mechanical systems (MEMS) chip 31, and a circuit board 35.

The MEMS chip 31 is connected to the controller 45, and is formed in a rectangular plate shape as a whole. The MEMS chip 31 has a mirror portion 32, an outer frame portion, and an inner frame portion. A reflective surface is formed on the mirror portion 32 by vapor deposition of aluminum or the like. The current flows in the outer frame portion and the inner frame portion to change the orientation of the mirror portion 32. Specifically, the mirror portion 32 is forced to oscillate about the forced scanning axis 38 while resonatingly oscillating about the resonant scanning axis 37. The center of the mirror portion 32 is substantially the scan center and is also the center of the exit pupil EP. The MEMS chip 31 causes the mirror portion 32 oscillating about the scanning axes 37 and 38 to function as the scanner 30a.

The circuit board 35 is formed in a rectangular plate shape having an area larger than the MEMS chip 31. The MEMS chip 31 is mounted on one mounting surface of the circuit board 35. The circuit board 35 is held directly or indirectly by the scanner housing 40. The orientation of the MEMS chip 31 is changed integrally with the circuit board 35 and the scanner housing 40.

Figure 5:
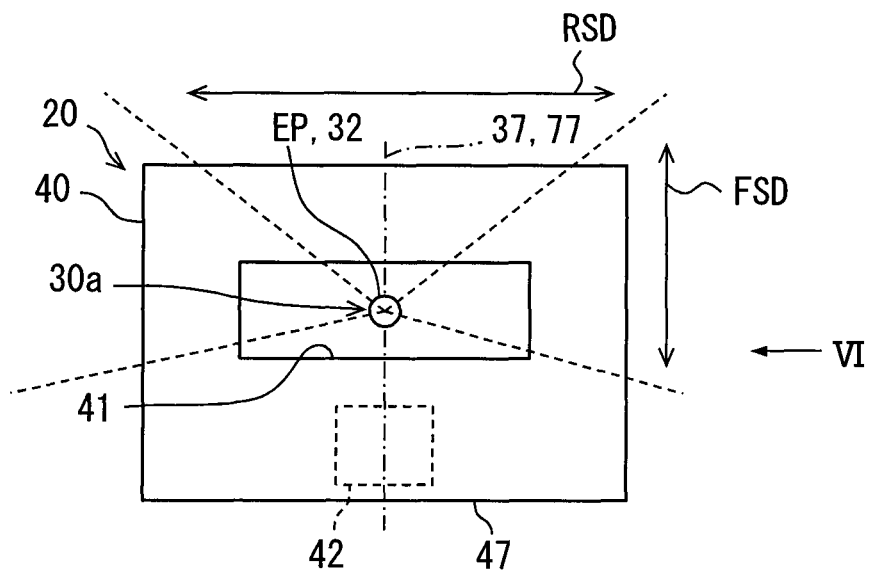
FIG. 5 is a front view of the optical scanning device according to the first embodiment.
Figure 6:
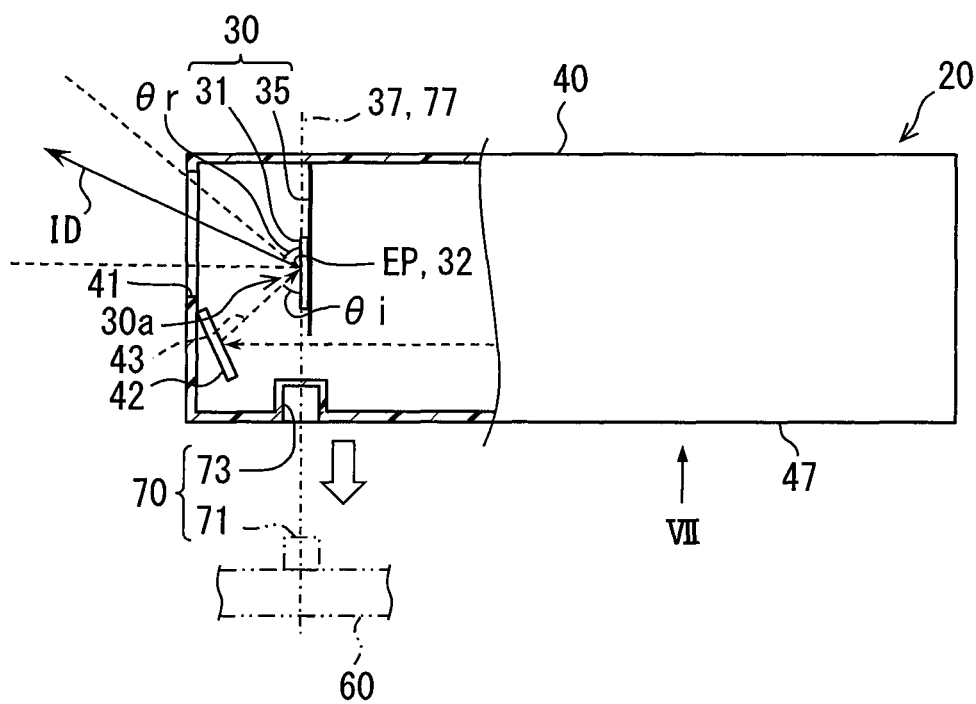
FIG. 6 is a right side view of the optical scanning device as viewed in an arrow direction VI of FIG. 5.
Figure 7:
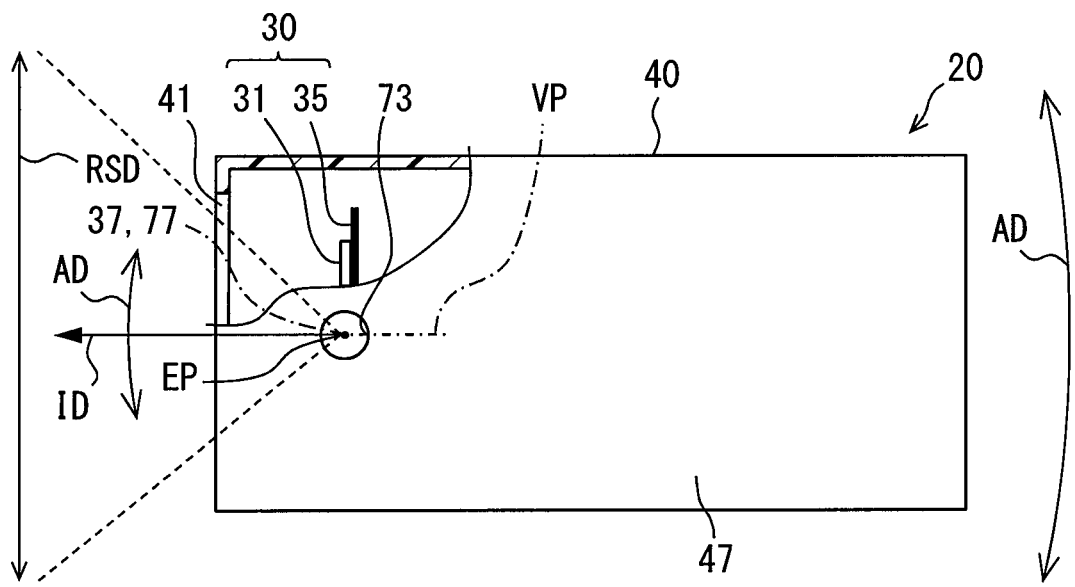
FIG. 7 is a bottom view of the optical scanning device as viewed in an arrow direction VII of FIG. 6.
Figure 8:
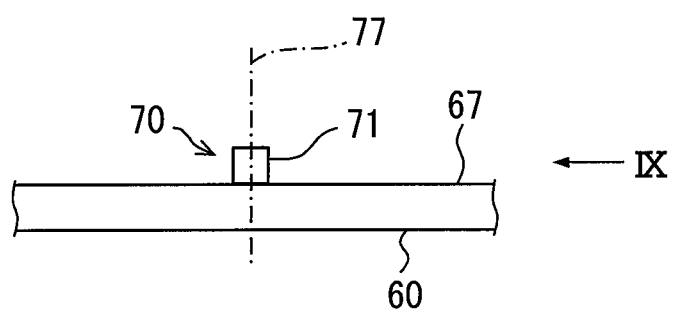
FIG. 8 is a front view of a HUD housing.
Figure 9:
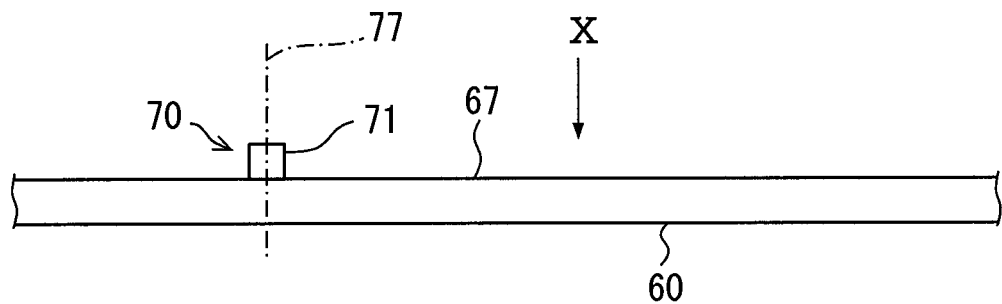
FIG. 9 is a right side view of the HUD housing as viewed in an arrow direction IX of FIG. 8.
Figure 10:
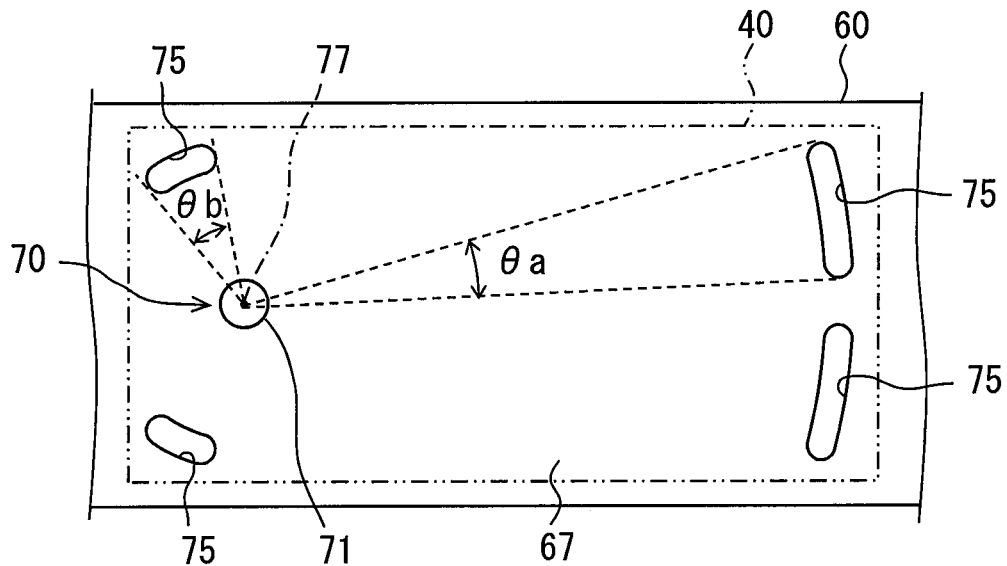
FIG. 10 is a plan view of the HUD housing as viewed in an arrow direction X of FIG. 9.
Figure 11:
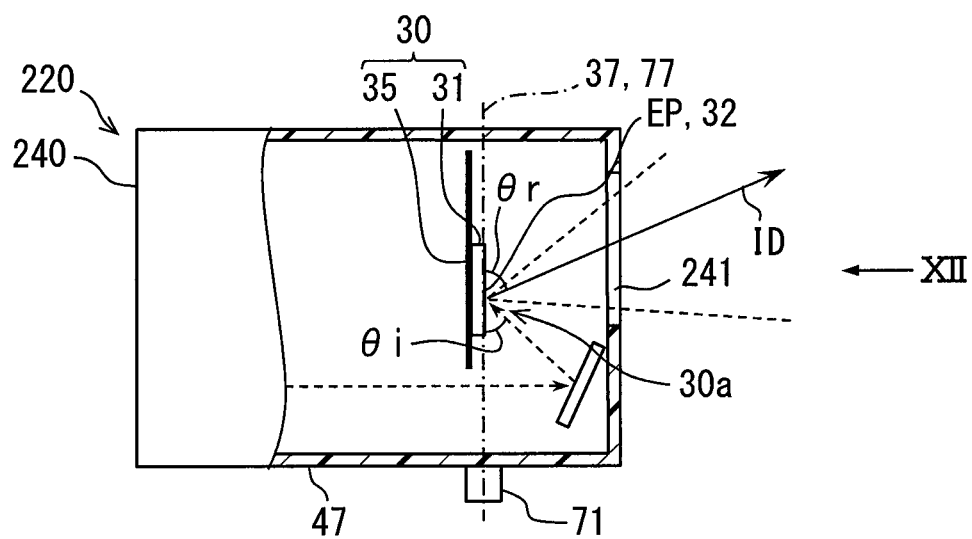
FIG. 11 is a front view of an optical scanning device according to a second embodiment.
Figure 12:
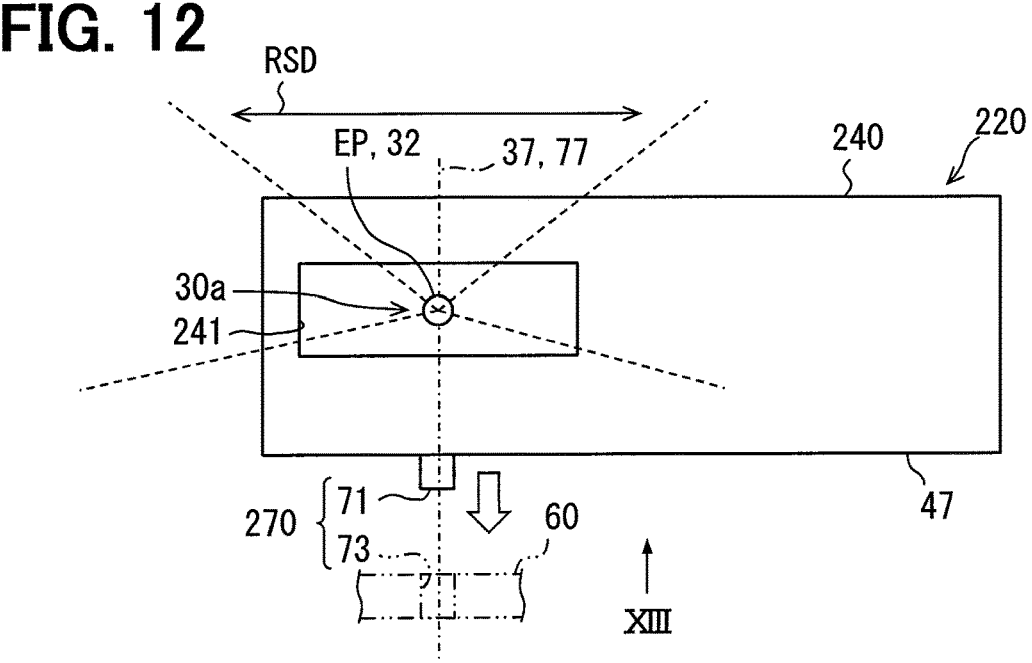
FIG. 12 is a right side view of the optical scanning device as viewed in an arrow direction XII of FIG. 11.
Figure 13:
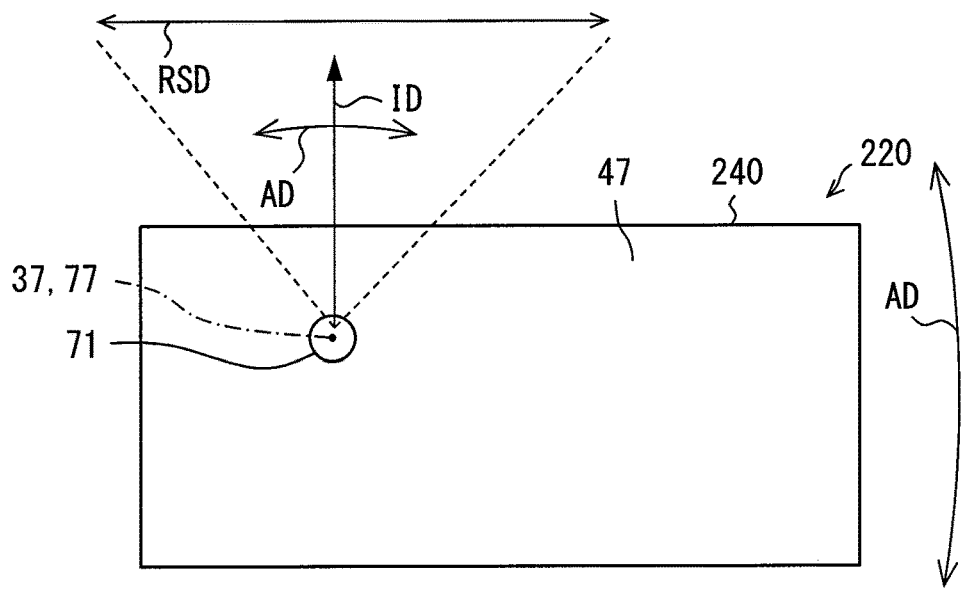
FIG. 13 is a bottom view of the optical scanning device as viewed in an arrow direction XIII of FIG. 12.
Figure 14:
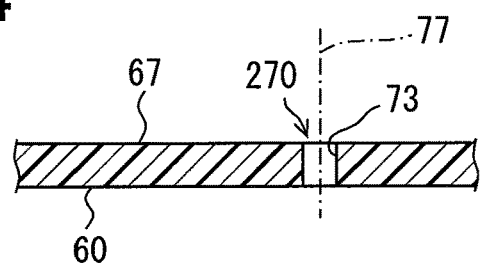
FIG. 14 is a cross-sectional view taken along a line XIV-XIV of FIG. 16.
Figure 15:
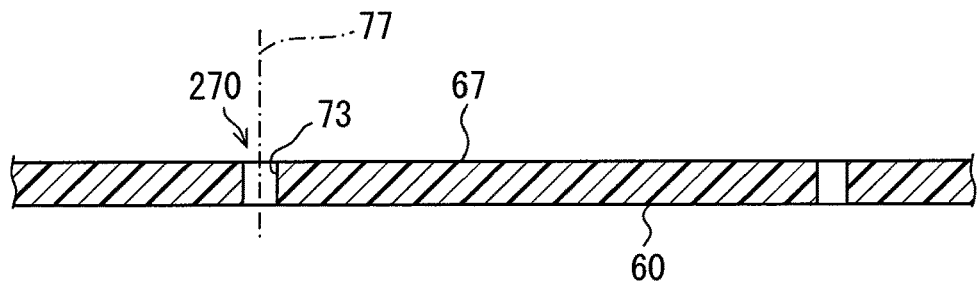
FIG. 15 is a cross-sectional view taken along a line XV-XV of FIG. 16.
Figure 16:
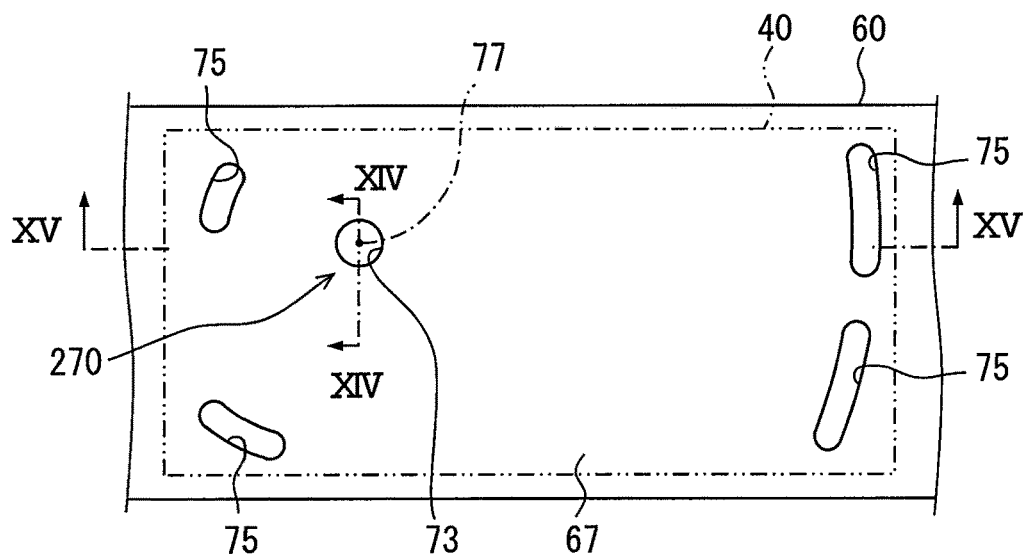
FIG. 16 is a plan view of the HUD housing.

The laser light source 44 is a light source that emits red, green, and blue laser light to be incident on the scanner 30a. The laser light source 44 is connected to the controller 45 and projects laser light of each hue based on a control signal from the controller 45. The reflecting mirror 42 reflects the laser light emitted from the laser light source 44 toward the mirror portion 32. The reflecting mirror 42 is held by the scanner housing 40 (see FIGS. 5 to 7).

The controller 45 is electrically connected to the laser light source 44 and the MEMS chip 31. The controller 45 causes the laser light to be intermittently pulsed based on the output of the control signal directed to the laser light source 44. The controller 45 controls the direction of the laser beam reflected by the mirror portion 32 as in the scanning locus ST (see also FIG. 4) by the output of the drive signal directed to the MEMS chip 31. The controller 45 causes the display area 51 to draw the display image 11 by integrally controlling the irradiation of the laser light and the scanning of the scanner 30a. The controller 45 may be formed on the circuit board 35 or may be held by the housing 40 separately from the circuit board 35.

The scanner housing 40 shown in FIGS. 2 and 5 to 7 is formed in a rectangular parallelepiped shape as a whole by a resin material or a metal material. The scanner housing 40 is housed in the HUD housing 60 shown in FIG. 1 and is held by the HUD housing 60. The scanner housing 40 is formed in a box shape as shown in FIGS. 2 and 5 to 7, and houses the scanner unit 30, the laser light source 44, and the reflecting mirror 42. The scanner housing 40 strictly defines the relative positional relationship among the scanner unit 30, the laser light source 44, the reflecting mirror 42, and the like. The scanner housing 40 has a projection window 41 for emitting laser light directed to the screen 50. The projection window 41 is open in one side wall surface, which is an end surface in the longitudinal direction among four side wall surfaces of the scanner housing 40.

Figure 4:
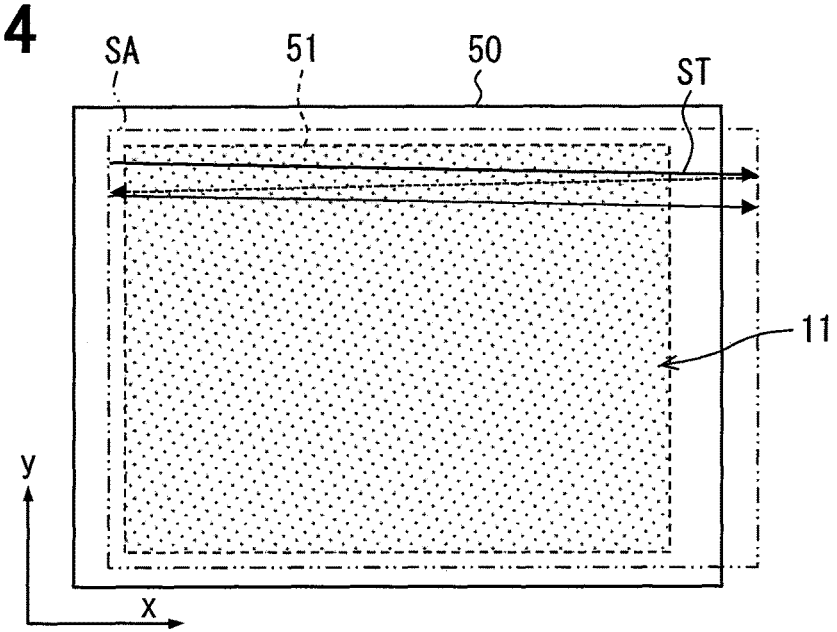
FIG. 4 is a schematic view showing a scanning range deviated from a display area.

The screen 50 shown in FIGS. 2 and 4 is an optical element in which a reflective surface is formed on a plate-like base material such as resin or metal by vapor deposition of aluminum or the like. The screen 50 is a micro mirror array (MMA) in which a large number of micro mirrors are two-dimensionally arranged on the reflective surface. The display area 51 is formed on the reflective surface in which the micro mirrors are arranged. The display area 51 is defined to have an area slightly smaller than the reflective surface. As shown in FIG. 1, the screen 50 is directly or indirectly held by the HUD housing 60 in a manner that the display area 51 is directed to the projection window 41 of the optical scanning device 20.

As shown in FIGS. 2 and 4, the display area 51 is formed in, for example, a rectangular shape longer in the left-right direction than in the up-down direction. The laser light emitted from the optical scanning device 20 is projected onto the display area 51. The laser light is scanned in the longitudinal direction (x-axis direction) of the display area 51 by resonant scanning of the scanner 30a, and is scanned in the lateral direction (y-axis direction) of the display area 51 by forced scanning of the scanner 30a. That is, the resonant scanning direction RSD (see FIGS. 5 and 7) of the scanner 30a is along the x-axis direction of the display area 51. The forced scanning direction FSD (see FIG. 5) of the scanner 30a is along the y-axis direction of the display area 51.

The concave mirror 63 shown in FIG. 1 is an optical element in which a reflective surface is formed by vapor deposition of aluminum or the like on a plate-like base material made of resin, glass or the like. The concave mirror 63 is curved. Specifically, the magnifying reflection surface 64 which is a deposition surface of aluminum is concave. The concave mirror 63 is disposed below the projection area PA and in front of the screen 50. The concave mirror 63 is directly or indirectly held by the HUD housing 60 in a manner that the magnifying reflection surface 64 is directed to the screen 50 and the projection area PA. The magnifying reflection surface 64 of the concave mirror 63 spreads and reflects the light incident from the screen 50 upward toward the windshield WS. Due to the reflection on the magnifying reflection surface 64, the virtual image 10 is formed, which is magnified from the display image 11 of the display area 51.

The HUD housing 60 is formed in a shape that can be held in a space secured in the vehicle. The HUD housing 60 is formed in a box shape by a resin material or a metal material. The optical scanning device 20, the screen 50, and the concave mirror 63 are housed in and held by the HUD housing 60. The HUD housing 60 strictly defines the relative positional relationship among the optical scanning device 20, the screen 50, and the concave mirror 63.

In the HUD device 100, the emission direction ID of the laser light emitted toward the screen 50 from the optical scanning device 20 inevitably varies. For example, as shown in FIGS. 2 and 4, when the emission direction ID deviates in the x-axis direction of the screen 50, the scan range SA (see FIG. 4) of the scanner 30a also deviates in the x-axis direction with respect to the screen 50. The optical scanning device 20 can locate the display area 51 within the scanning range SA by expanding the amplitude of the oscillation around the resonant scanning axis 37, that is, by expanding the scanning angle of the scanner 30a. The scanning angle of the scanner 30a can be controlled by the controller 45.

However, as the scanning angle is widened with respect to the display area 51, the scanning speed also increases, and the luminance of the display image 11 decreases. In order to suppress such a decrease in luminance, the scanner housing 40 and the HUD housing 60 are provided with an adjustment structure 70 shown in FIGS. 5 to 10. The emission direction ID indicates the traveling direction of the laser light emitted from the optical scanning device 20 in a state where the oscillation of the scanner 30a is stopped. The angle θr of the optical axis along the emission direction ID with respect to the mirror portion 32 is the same as the angle θi of the optical axis 43 of the laser light incident on the mirror portion 32 with respect to the mirror portion 32 (see FIG. 6).

The adjustment structure 70 includes a pin hole 73, an adjustment pin 71, and a long hole 75. The adjustment structure 70 is configured to allow relative rotation of the scanner housing 40 with respect to the HUD housing 60. The adjustment structure 70 makes it possible to adjust the emission direction ID of light emitted from the scanner housing 40 at least around the resonant scanning axis 37.

The pin hole 73 is one cylindrical hole formed in the bottom wall 47 of the scanner housing 40. The bottom wall 47 is formed in a flat shape, and comes in contact with the HUD housing 60 by assembling the scanner housing 40. The pin hole 73 is formed in the bottom wall 47 at a position intersecting the resonant scanning axis 37 of the scanner 30a. The axial direction of the pin hole 73 is substantially perpendicular to the bottom wall 47. The depth dimension of the pin hole 73 is slightly larger than the height dimension of the adjustment pin 71. The inner diameter of the pin hole 73 is the same as the outer diameter of the adjustment pin 71 or slightly larger than the outer diameter of the adjustment pin 71. The pin hole 73 is fitted to the outer side of the adjustment pin 71.

The adjustment pin 71 and the long hole 75 are formed in the assembly wall 67 of the HUD housing 60. The scanner housing 40 is assembled to the assembly wall 67. Only one adjustment pin 71 is provided on the assembly wall 67 and protrudes from the assembly wall 67 in a cylindrical shape. The axial direction of the adjustment pin 71 is substantially perpendicular to the assembly wall 67. The adjustment pin 71 is fitted with the inner side of the pin hole 73. When the outer peripheral wall of the adjustment pin 71 slides on the inner peripheral wall of the pin hole 73, the scanner housing 40 rotates relative to the HUD housing 60 around the virtual adjustment axis 77.

The adjustment axis 77 substantially coincides with the central axis of the adjustment pin 71 and the pin hole 73, and also substantially coincides with the resonant scanning axis 37 of the scanner 30a. Therefore, the adjustment direction AD of the scanner housing 40 around the adjustment axis 77 is a direction along the resonant scanning direction RSD. Further, the adjustment axis 77 intersects the mirror portion 32 in the scanner unit 30. In addition, when the virtual plane VP is defined to include the optical axis 43 of the laser light incident on the scanner 30a and the resonant scanning axis 37, the adjustment axis 77 is oriented along the virtual plane VP and is included in the virtual plane VP.

The long hole 75 is an opening passing through the assembly wall 67 in the thickness direction. Plural (four) long holes 75 are formed in the assembly wall 67 (see FIG. 10). Each long hole 75 has an arc shape centering on the adjustment pin 71. The central angles θa and θb of the respective long holes 75 about the adjustment pin 71 are defined to be substantially the same. Therefore, the long hole 75 far from the adjustment pin 71 is longer than the long hole 75 near the adjustment pin 71. The scanner housing 40 is fixed to the HUD housing 60 by a fastening member such as screw inserted in the long hole 75.

Due to the adjustment structure 70, the scanner housing 40 can be rotated about the adjustment axis 77 by moving the scanner housing 40 in the adjustment direction AD when a worker or a work machine assembles the scanner housing 40 to the HUD housing 60. Accordingly, the emission direction ID of the laser light can be adjusted in the correct direction to reduce the scan amount of the scanning range SA out of the display area 51 (see FIG. 2).

The adjustment axis 77 of the adjustment structure 70 is substantially coincident with the resonant scanning axis 37. Therefore, the exit pupil EP of the optical scanning device 20 is located on the adjustment axis 77. Therefore, even when the scanner housing 40 is rotated relative to the HUD housing 60 in order to adjust the emission direction ID, the position of the exit pupil EP does not move substantially with respect to the screen 50. In case where the position of the exit pupil EP is moved by the adjustment of the emission direction ID, the relative position between the exit pupil EP and the screen 50 changes, and the position of the eye box EB is also significantly moved. In contrast, when the position of the exit pupil EP is maintained as described above, the change in the relative optical position between the exit pupil EP and the screen 50 is small. Therefore, the positional change of the eye box EB is also suppressed. As a result, it is possible to narrow the scanning angle of the scanner 30a while maintaining the visible range of the virtual image 10. Therefore, it is possible to suppress the decrease in luminance of the virtual image 10.

The change in the optical relative position includes a change in the optical path length along the optical axis between the screen 50 and the exit pupil EP, and a change in the up-down and left-right directions due to the parallel movement with respect to the optical axis.

As in the first embodiment, when the adjustment axis 77 intersects the mirror portion 32, the positional change of the exit pupil EP due to the rotation in the adjustment direction AD is further reduced or substantially eliminated. Therefore, the movement of the eye box EB caused by the adjustment of the emission direction ID can be minimized.

Further, as in the first embodiment, when the adjustment axis 77 is along the resonant scanning axis 37, the rotation of the scanner housing 40 around the adjustment axis 77 can be directly reflected in the adjustment of the emission direction ID along the resonant scanning direction RSD. Therefore, the operation of adjusting the emission direction ID by the rotation of the scanner housing 40 becomes easier.

Furthermore, the emission direction ID can be adjusted along the resonant scanning direction RSD by the adjustment structure 70 of the first embodiment. As described above, when the scanner 30a is subjected to resonant scanning, the amplitude of the mirror portion 32 is substantially controllable. That is, only the scanning angle is mainly controllable. Therefore, when the emission direction ID is controllable around the resonant scanning axis 37, the reduction in luminance caused by the reduction in the scanning angle can be certainty suppressed.

In the first embodiment, the windshield WS corresponds to a projection member. The MEMS chip 31 corresponds to a scanner chip. The resonant scanning axis 37 corresponds to a scanning axis. The laser light source 44 corresponds to a light source. Further, the adjustment pin 71 corresponds to a cylindrical portion. The pin hole 73 corresponds to a cylindrical hole. The HUD housing 60 corresponds to an outer housing. The driver D correspond to a viewer.

Second Embodiment

The second embodiment of the present disclosure shown in FIGS. 11 to 16 is a modification of the first embodiment.

The projection window 241 is open in one side wall surface along the longitudinal direction, among the four side wall surfaces of the scanner housing 240, in the optical scanning device 220 of the second embodiment. The scanner unit 30 is held by the scanner housing 240 in a manner that the front surface of the scanner 30a is directed to the projection window 241. The resonant scanning direction RSD in the optical scanning device 220 is along the longitudinal direction of the scanner housing 240.

The adjustment pin 71 is provided on the bottom wall 47 of the scanner housing 240, in the adjustment structure 270 of the second embodiment. The adjustment pin 71 is disposed on the bottom wall 47 to be coaxial with the resonant scanning axis 37 of the scanner 30a. The pin hole 73 and the long hole 75 are provided in the assembly wall 67 of the HUD housing 60. Also in the adjustment structure 270 described above, the orientation of the optical scanning device 220 is adjusted in the adjustment direction AD around the adjustment axis 77. Therefore, the emission direction ID of the laser light can be adjusted in the correct direction to reduce the scan amount of the scan range SA (see FIG. 2) out of the display area 51 in the resonant scan direction RSD.

Also in the second embodiment, the adjustment axis 77 substantially coincides with the resonant scanning axis 37, and passes through the center of the mirror portion 32 of the scanner unit 30. Therefore, even when the emission direction ID is adjusted, the position of the exit pupil EP does not substantially move. Hence, the position of the eye box EB (see FIG. 1) does not substantially move. Therefore, it is possible to narrow the scanning angle of the scanner 30a while maintaining the visible range of the virtual image 10 (see FIG. 1).

In addition, in the second embodiment, the MEMS chip 31 and the adjustment axis 77 are substantially parallel. Therefore, the rotation of the scanner housing 240 about the adjustment axis 77 can be directly reflected in the adjustment of the emission direction ID in the resonant scanning direction RSD. Therefore, the operation of adjusting the emission direction ID can be easier. In the second embodiment, as in the first embodiment, the angle θr of the optical axis along the emission direction ID with respect to the mirror portion 32 is identical to the angle θi of the optical axis 43 of the laser light incident on the mirror portion 32 with respect to the mirror portion 32 (see FIG. 11).

Third Embodiment

Figure 17:
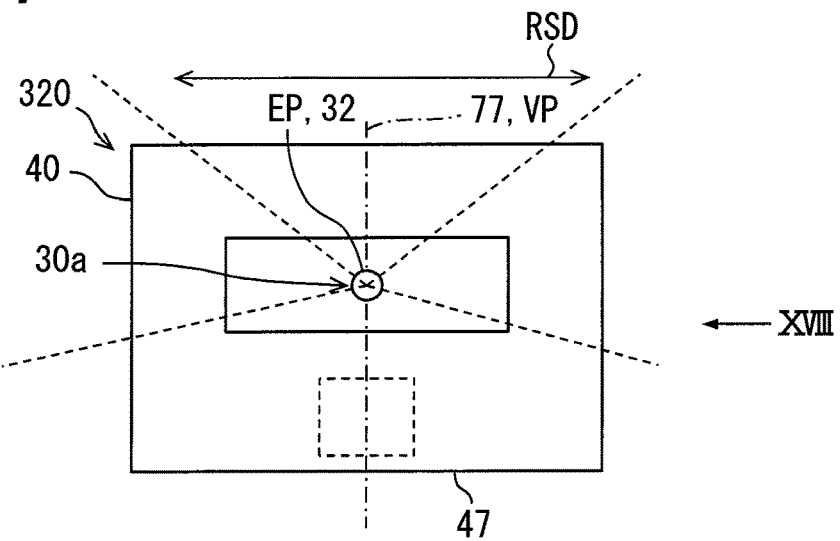
FIG. 17 is a front view of an optical scanning device according to a third embodiment.
Figure 18:
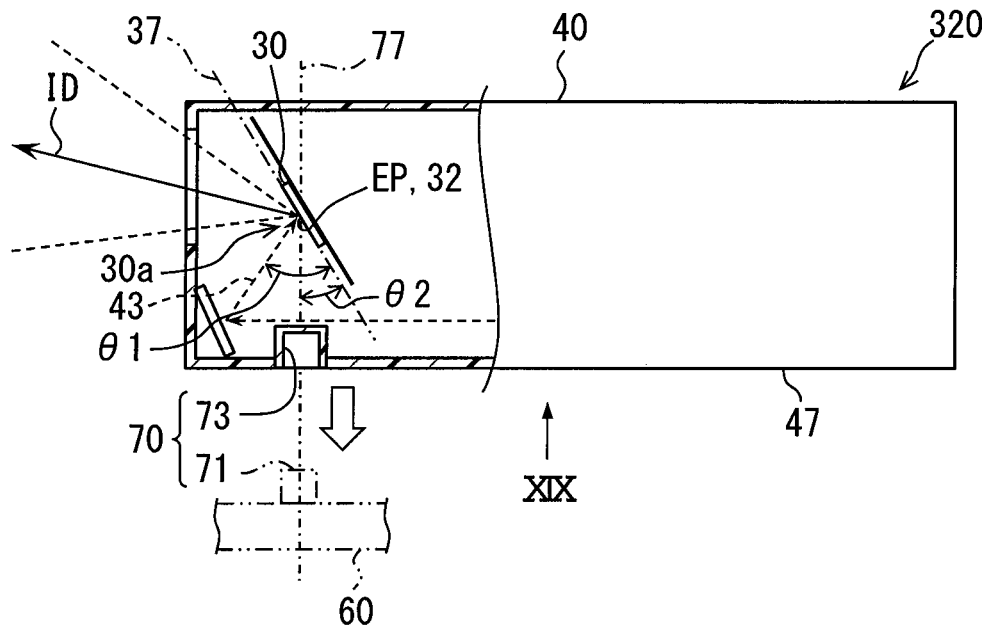
FIG. 18 is a right side view of the optical scanning device as viewed in an arrow direction XVIII of FIG. 17.
Figure 19:
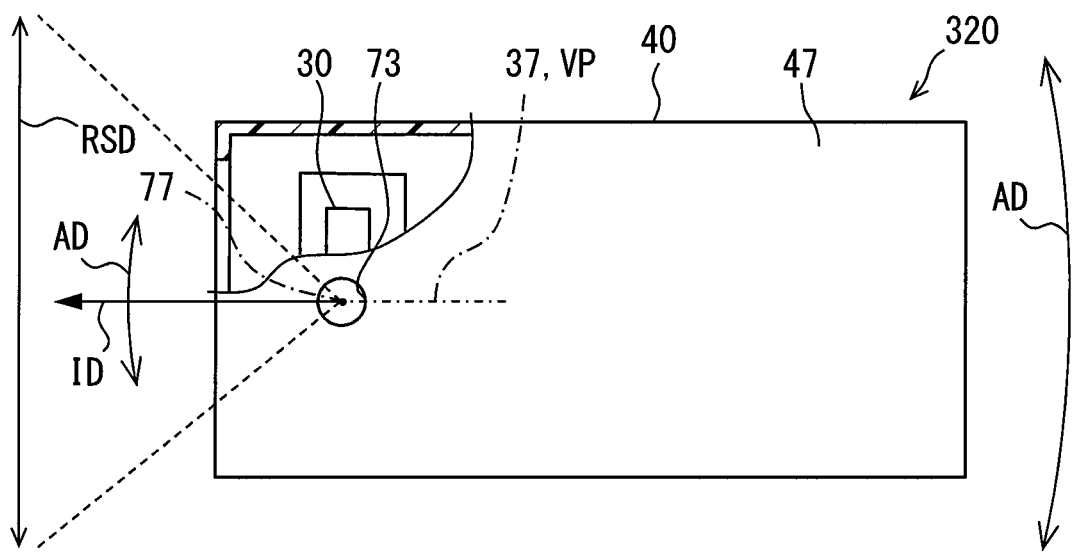
FIG. 19 is a bottom view of the optical scanning device as viewed in an arrow direction XIX of FIG. 18.
Figure 20:
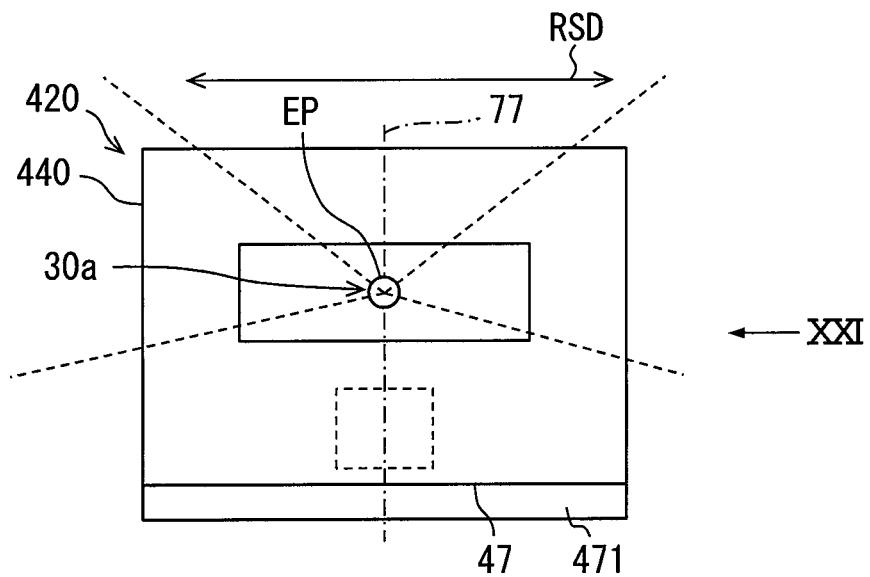
FIG. 20 is a front view of an optical scanning device according to a fourth embodiment.
Figure 21:
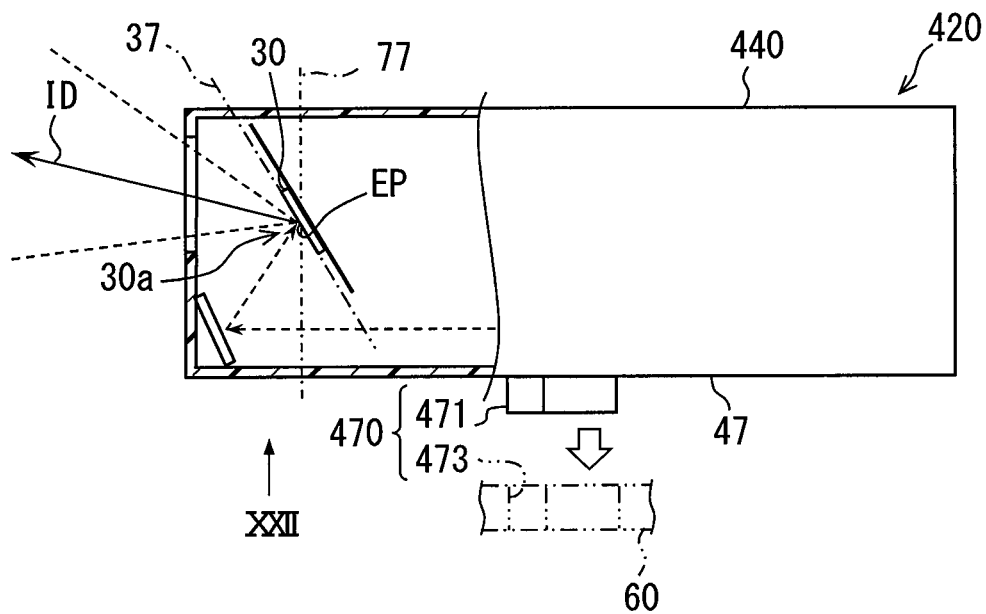
FIG. 21 is a right side view of the optical scanning device as viewed in an arrow direction XXI of FIG. 20.
Figure 22:
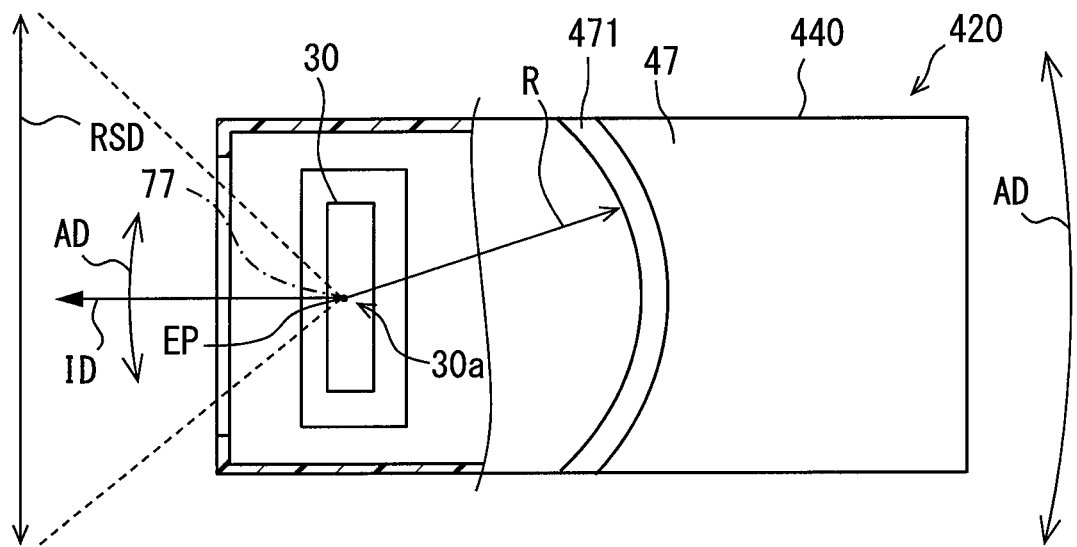
FIG. 22 is a bottom view of the optical scanning device as viewed in an arrow direction XXII of FIG. 21.
Figure 23:
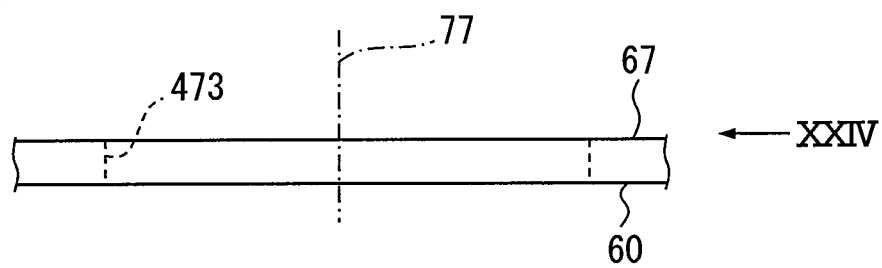
FIG. 23 is a front view of the HUD housing.
Figure 24:
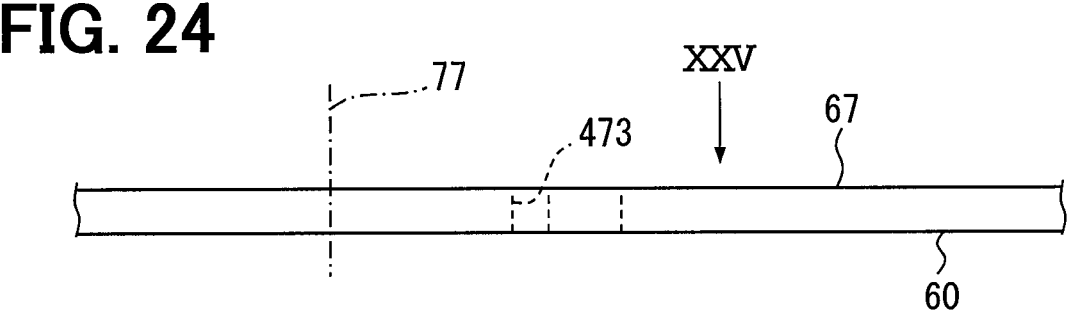
FIG. 24 is a right side view of the HUD housing as viewed in an arrow direction XXIV of FIG. 23.
Figure 25:
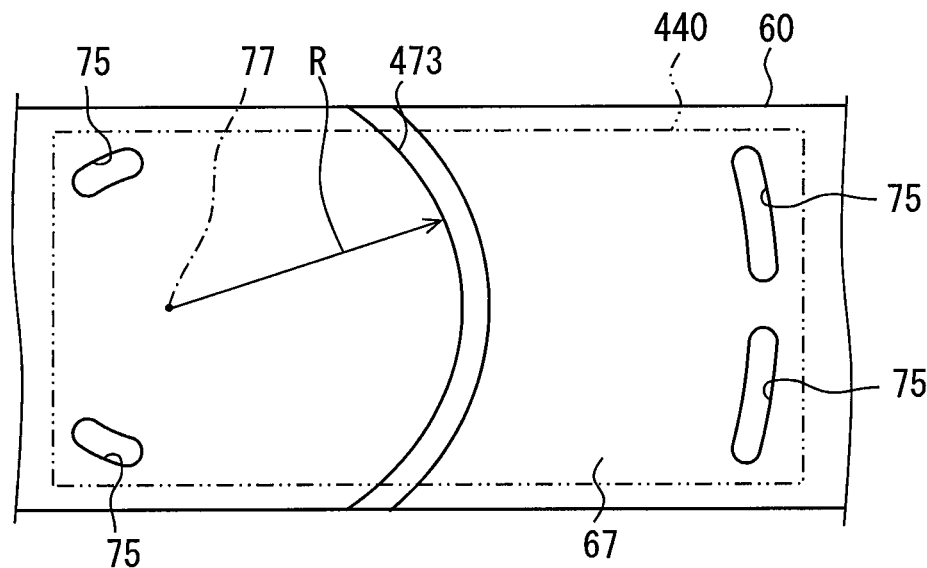
FIG. 25 is a plan view of the HUD housing as viewed in an arrow direction XXV of FIG. 24.
Figure 26:
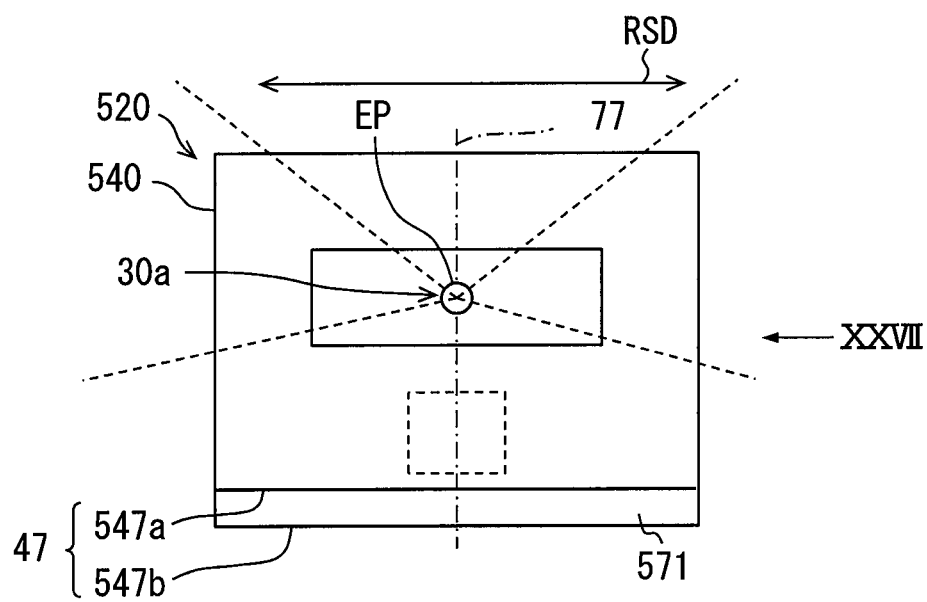
FIG. 26 is a front view of an optical scanning device according to a fifth embodiment.
Figure 27:
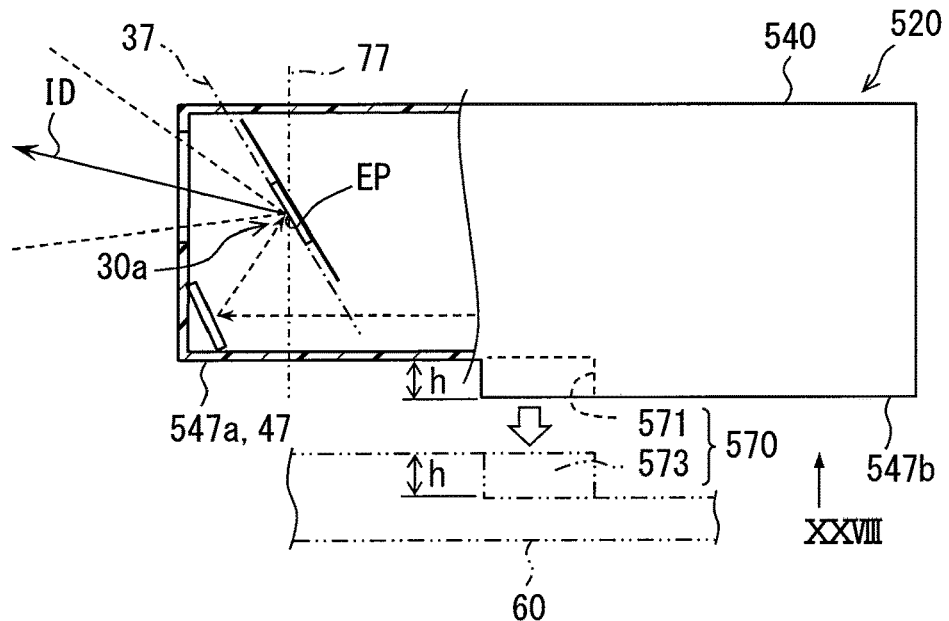
FIG. 27 is a right side view of the optical scanning device as viewed in an arrow direction XXVII of FIG. 26.
Figure 28:
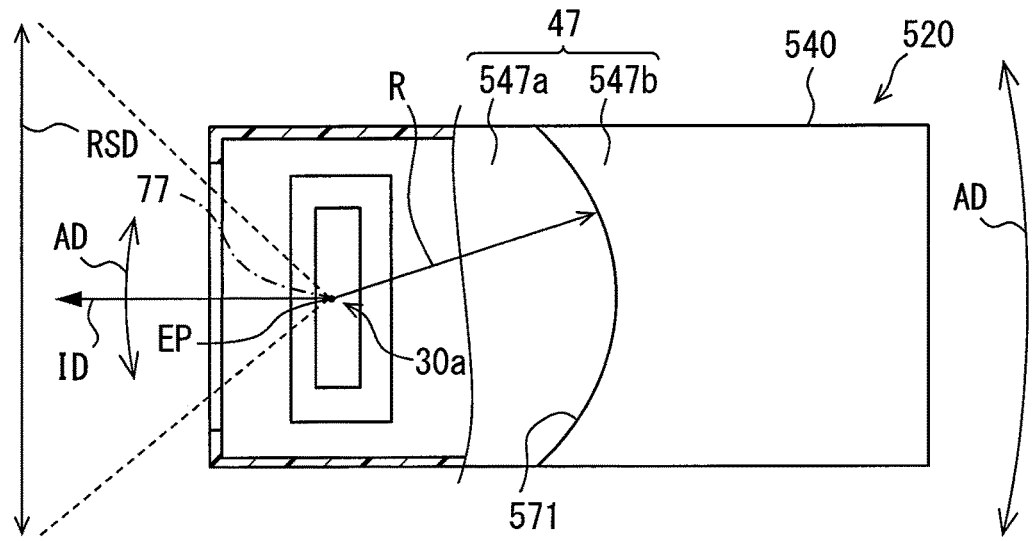
FIG. 28 is a bottom view of the optical scanning device as viewed in an arrow direction XXVIII of FIG. 27.
Figure 29:
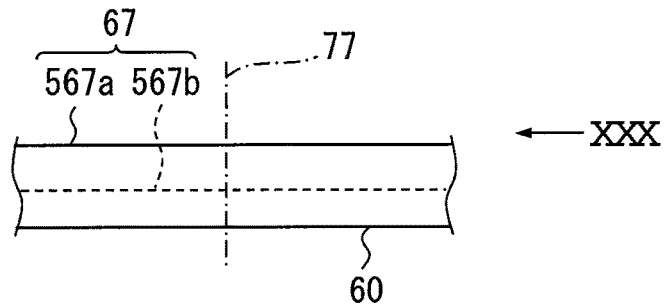
FIG. 29 is a front view of the HUD housing.
Figure 30:
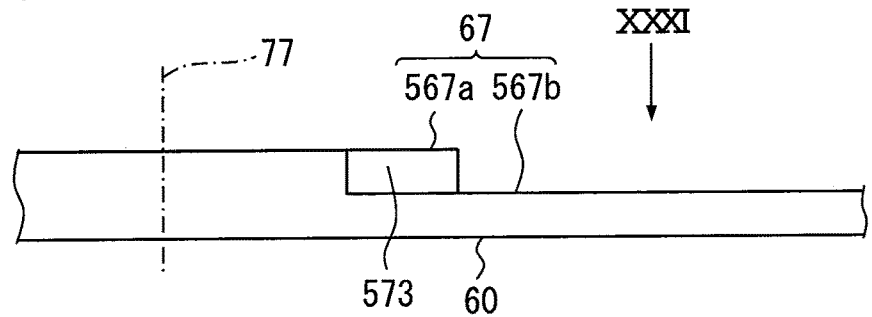
FIG. 30 is a right side view of the HUD housing as viewed in an arrow direction XXX of FIG. 29.
Figure 31:
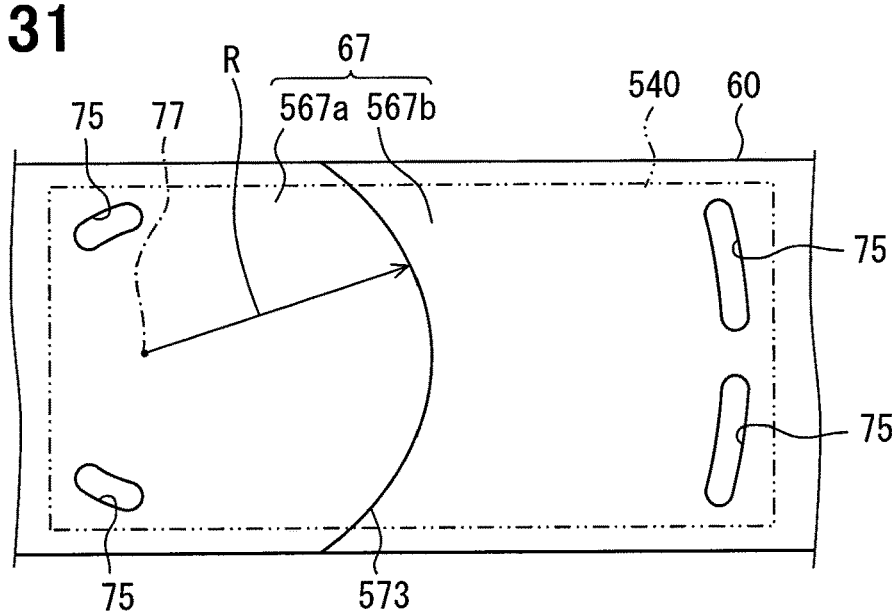
FIG. 31 is a plan view of the HUD housing as viewed in an arrow direction XXXI of FIG. 30.
Figure 32:
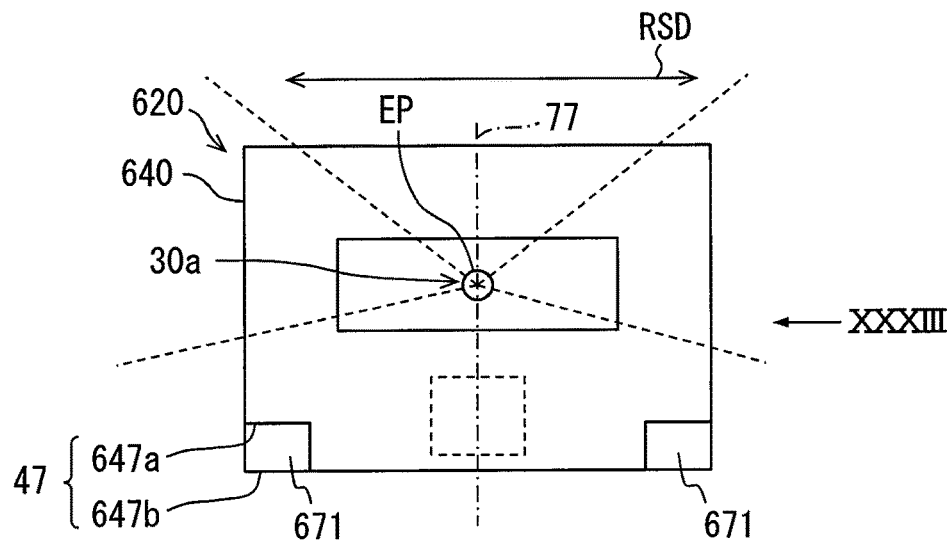
FIG. 32 is a front view of an optical scanning device according to a sixth embodiment.
Figure 33:
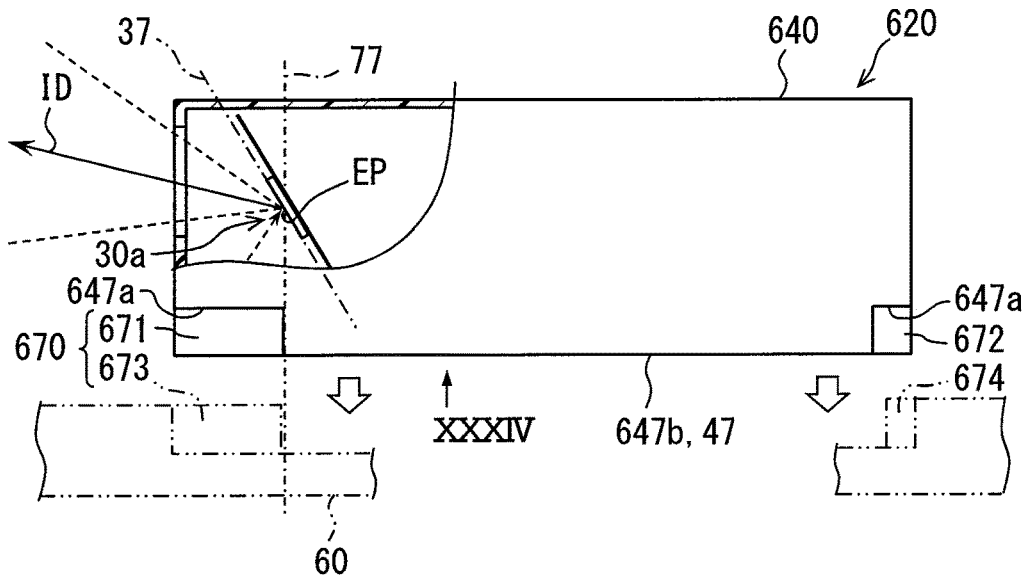
FIG. 33 is a right side view of the optical scanning device as viewed in an arrow direction XXXIII of FIG. 32.
Figure 34:
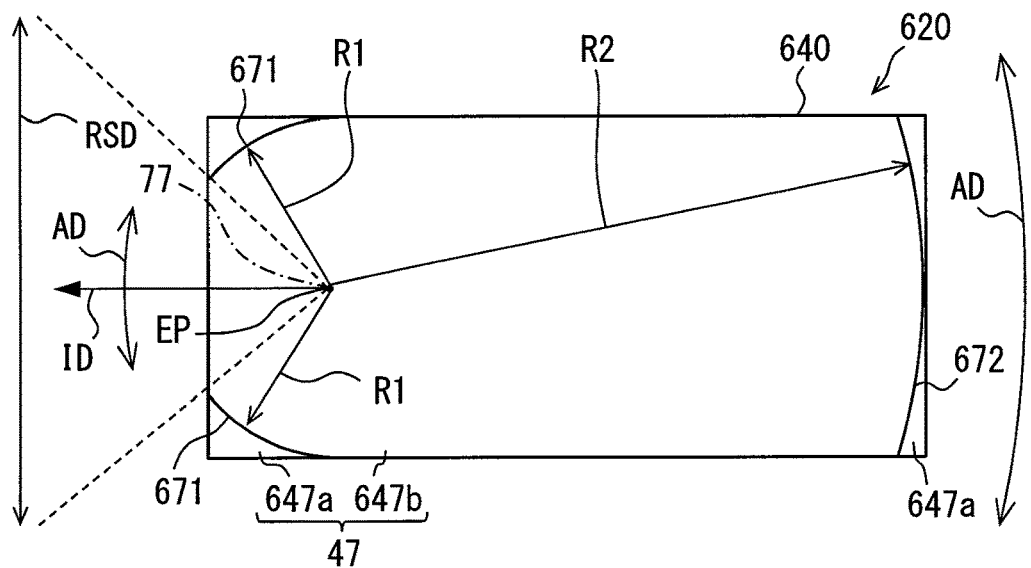
FIG. 34 is a bottom view of the optical scanning device as viewed in an arrow direction XXXIV of FIG. 33.
Figure 35:
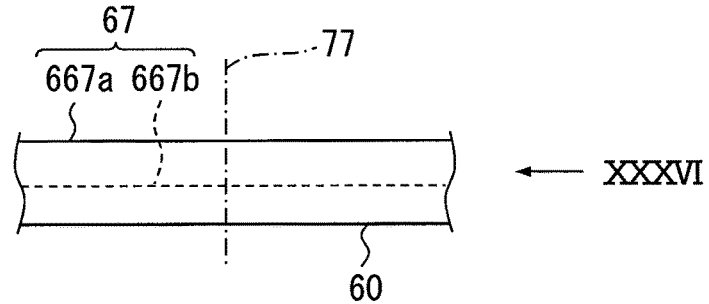
FIG. 35 is a front view of the HUD housing.
Figure 36:
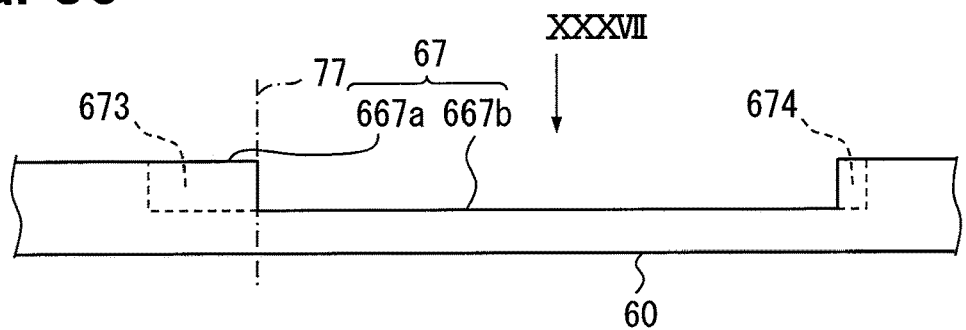
FIG. 36 is a right side view of the HUD housing as viewed in an arrow direction XXXVI of FIG. 35.
Figure 37:
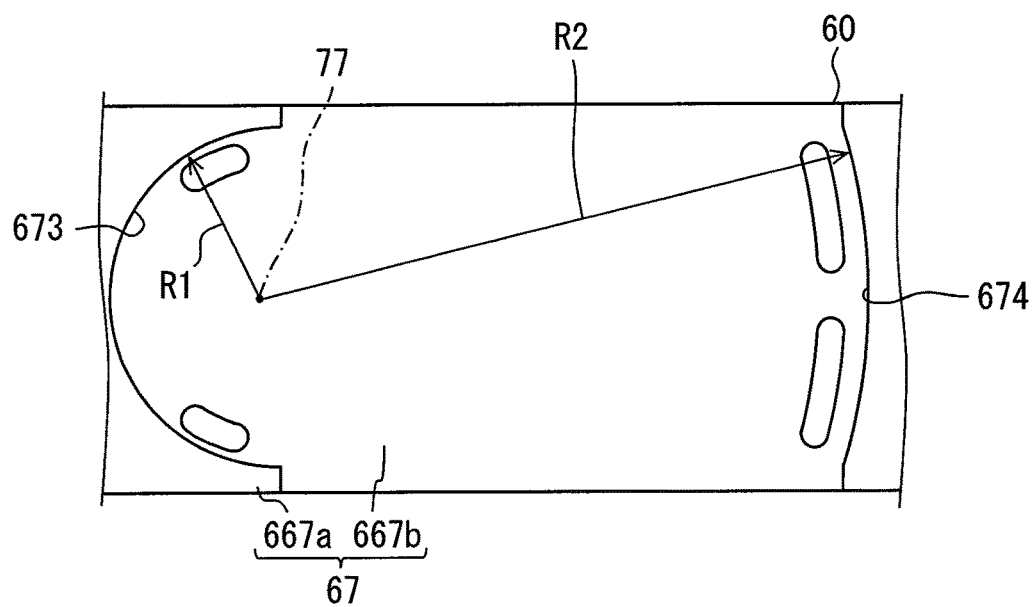
FIG. 37 is a plan view of the HUD housing as viewed in an arrow direction XXXVII of FIG. 36.

The third embodiment of the present disclosure shown in FIGS. 17 to 19 is another modification of the first embodiment. In the optical scanning device 320 according to the third embodiment, the scanner unit 30 is held by the scanner housing 40 to be inclined with respect to the bottom wall 47. The adjustment axis 77 of the adjustment structure 70, which is the central axis of the pin hole 73 and the adjustment pin 71, is inclined with respect to the resonant scanning axis 37. As in the first embodiment, when the virtual plane VP is defined to include the optical axis 43 and the resonant scanning axis 37, the adjustment axis 77 is oriented along the virtual plane VP and is included in the virtual plane VP. Further, the resonant scanning direction RSD of the scanner 30a is defined to be substantially perpendicular to the virtual plane VP.

When the resonant scanning axis 37, the optical axis 43, and the adjustment axis 77 are viewed in a direction perpendicular to the virtual plane VP (see FIG. 18), the inclination angle θ2 of the adjustment axis 77 with respect to the resonant scanning axis 37 is smaller than the inclination angle θ1 of the optical axis 43 with respect to the resonant scanning axis 37. In other words, the adjustment axis 77 is disposed within an acute angle formed between the resonant scanning axis 37 and the optical axis 43 in the virtual plane VP.

Also in the third embodiment, the adjustment axis 77 passes through the center of the mirror portion 32 in the scanner unit 30. Therefore, when the emission direction ID is adjusted, the position of the exit pupil EP and the position of the eye box EB (see FIG. 1) do not substantially move. Therefore, it is possible to narrow the scanning angle of the scanner 30a and suppress the decrease in luminance of the virtual image 10 while maintaining the visible range of the virtual image 10 (see FIG. 1).

The inclination of the scanner 30a with respect to the adjustment axis 77 can be suppressed to be smaller by making the inclination angle θ2 smaller than the inclination angle θ1. Therefore, the rotation of the scanner housing 40 around the adjustment axis 77 tends to be directly reflected in the adjustment of the emission direction ID in the resonant scanning direction RSD. The shape of the HUD housing 60 of the third embodiment is substantially the same as that of the first embodiment shown in FIG. 8 to FIG. 10.

Fourth Embodiment

The fourth embodiment of the present disclosure shown in FIGS. 20 to 25 is a modification of the third embodiment. The adjustment structure 470 of the fourth embodiment has an adjustment rail 471 and a rail groove 473 to control the emission direction ID of the optical scanning device 420. The adjustment rail 471 is provided on the bottom wall 47 of the scanner housing 440. The adjustment rail 471 is projected in an arc shape with a radius R about the adjustment axis 77. The adjustment rail 471 is extended at a constant rail width. The adjustment axis 77 is oriented substantially perpendicular to the bottom wall 47, and passes through the exit pupil EP of the scanner 30a. The scanner unit 30 is held by the scanner housing 440 in an inclined posture. Therefore, the resonant scanning axis 37 is inclined with respect to the bottom wall 47.

The rail groove 473 and the four long holes 75 are formed in the assembly wall 67 of the HUD housing 60. The rail groove 473 is an opening passing through the assembly wall 67 in the thickness direction. The rail groove 473 is formed in an arc shape with a radius R, similarly to the adjustment rail 471. The groove width of the rail groove 473 is slightly larger than the rail width of the adjustment rail 471. The rail groove 473 is fitted to the adjustment rail 471.

When the adjustment rail 471 moves along the rail groove 473, the scanner housing 440 rotates relative to the HUD housing 60 about the adjustment axis 77 as a rotation center. Therefore, the emission direction ID can be adjusted in the adjustment direction AD to the correct direction. In the adjustment structure 470, since the adjustment axis 77 passes through the exit pupil EP, the position of the exit pupil EP does not substantially move, hence the position of the eye box EB (see FIG. 1) does not substantially move even while the emission direction ID is adjusted. Therefore, it is possible to narrow the scanning angle of the scanner 30a and suppress the decrease in luminance of the virtual image 10 while maintaining the visible range of the virtual image 10 (see FIG. 1).

In the fourth embodiment, the adjustment rail 471 corresponds to a rail portion. Further, the adjustment rail 471 and the rail groove 473 may be reversed. Specifically, the rail groove 473 may be provided in the scanner housing 440 while the adjustment rail 471 may be provided in the HUD housing 60.

Fifth Embodiment

The fifth embodiment of the present disclosure shown in FIGS. 26 to 31 is another modification of the third embodiment. In the adjustment structure 570 of the fifth embodiment, the emission direction ID of the optical scanning device 520 can be adjusted by a pair of stepped portions 571 and 573. The stepped portion 571 is provided on the bottom wall 47 of the scanner housing 540. The stepped portion 571 is formed in an arc having a radius R about the adjustment axis 77. The stepped portion 571 divides the bottom wall 47 into a first bottom wall 547a and a second bottom wall 547b. The stepped portion 571 forms a step with a height h between the first bottom wall 547a and the second bottom wall 547b. The second bottom wall 547b protrudes toward the HUD housing 60 by the height h with respect to the first bottom wall 547a.

The stepped portion 573 is formed on the assembly wall 67 of the HUD housing 60 together with the four long holes 75. Similar to the stepped portion 571, the stepped portion 573 is formed in an arc shape having a radius R. The stepped portion 573 divides the assembly wall 67 into a first assembly wall 567a and a second assembly wall 567b. The stepped portion 573 forms a step with a height h between the first assembly wall 567a and the second assembly wall 567b. The first assembly wall 567a protrudes toward the scanner housing 540 by a height h with respect to the second assembly wall 567b. The stepped portions 571 and 573 are slidably in contact with each other.

In the adjustment structure 570 described above, when the stepped portion 571 slides along the stepped portion 573, the scanner housing 540 rotates relative to the HUD housing 60 about the adjustment axis 77 as a rotation center. As a result, the emission direction ID can be adjusted in the adjustment direction AD to the correct direction. In the adjustment structure 570, since the adjustment axis 77 passes through the exit pupil EP, the position of the exit pupil EP does not substantially move, hence the position of the eye box EB (see FIG. 1) does not substantially move while the emission direction ID is adjusted. Therefore, it is possible to narrow the scanning angle of the scanner 30a and suppress the decrease in luminance of the virtual image 10 while maintaining the visible range of the virtual image 10 (see FIG. 1).

The bottom wall 47 and the assembly wall 67 may be reversed. Specifically, while the first assembly wall 567a may protrude from the second assembly wall 567b, the second assembly wall 567b may protrude from the first assembly wall 567a.

Sixth Embodiment

The sixth embodiment of the present disclosure illustrated in FIGS. 32 to 37 is a modification of the fifth embodiment. The adjustment structure 670 of the fifth embodiment includes plural stepped portions 671 to 674. The scanner housing 640 has two stepped portions 671 and one stepped portion 672. The stepped portions 671 are provided at respective sides of the adjustment axis 77. The stepped portion 671 is formed in an arc shape having a radius R1 about the adjustment axis 77. The stepped portion 672 is provided at a position farther from the adjustment axis 77 than the stepped portion 671. The stepped portion 672 is formed in an arc shape having a radius R2 about the adjustment axis 77. The radius R2 is larger than the radius R1. The centers of the stepped portions 671 and 672 are at the adjustment axis 77. The bottom wall 47 is divided into a first bottom wall 647a and a second bottom wall 647b by the stepped portions 671, 672. The first bottom wall 647a is recessed from the second bottom wall 647b.

The HUD housing 60 has the stepped portions 673 and 674. The stepped portion 673 is formed in an arc shape having a radius R1. The stepped portion 674 is formed in an arc shape having a radius R2. The centers of the stepped portions 673 and 674 coincide with each other. The assembly wall 67 is divided into a first assembly wall 667a and a second assembly wall 667b by the stepped portion 673, 674. The first assembly wall 667a protrudes toward the scanner housing 640 with respect to the second assembly wall 667b. The stepped portion 673 is slidably in contact with the stepped portion 671. The stepped portion 674 is slidably in contact with the stepped portion 672.

In the adjustment structure 670, when the stepped portion 671, 672 slides along the stepped portion 673, 674, the scanner housing 640 rotates relative to the HUD housing 60 around the adjustment axis 77. As a result, the orientation of the optical scanning device 620 is adjusted in the adjustment direction AD, and the emission direction ID can be directed in the correct direction. In the adjustment structure 670, since the adjustment axis 77 passes through the exit pupil EP, the position of the exit pupil EP does not substantially move, hence the position of the eye box EB (see FIG. 1) does not substantially move even while the emission direction ID is adjusted. Therefore, it is possible to narrow the scanning angle of the scanner 30a and suppress the decrease in luminance of the virtual image 10 while maintaining the visible range of the virtual image 10 (see FIG. 1).

Seventh Embodiment

Figure 38:
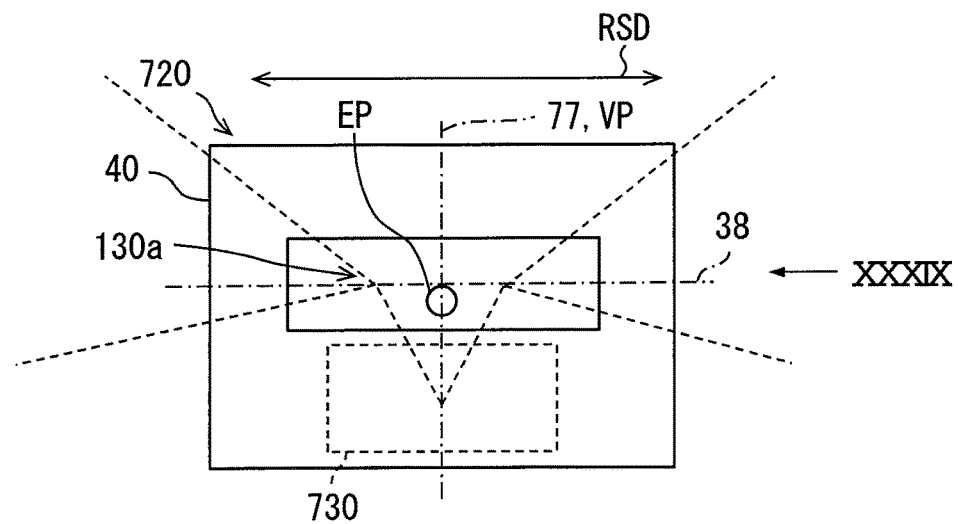
FIG. 38 is a front view of an optical scanning device according to a seventh embodiment.
Figure 39:
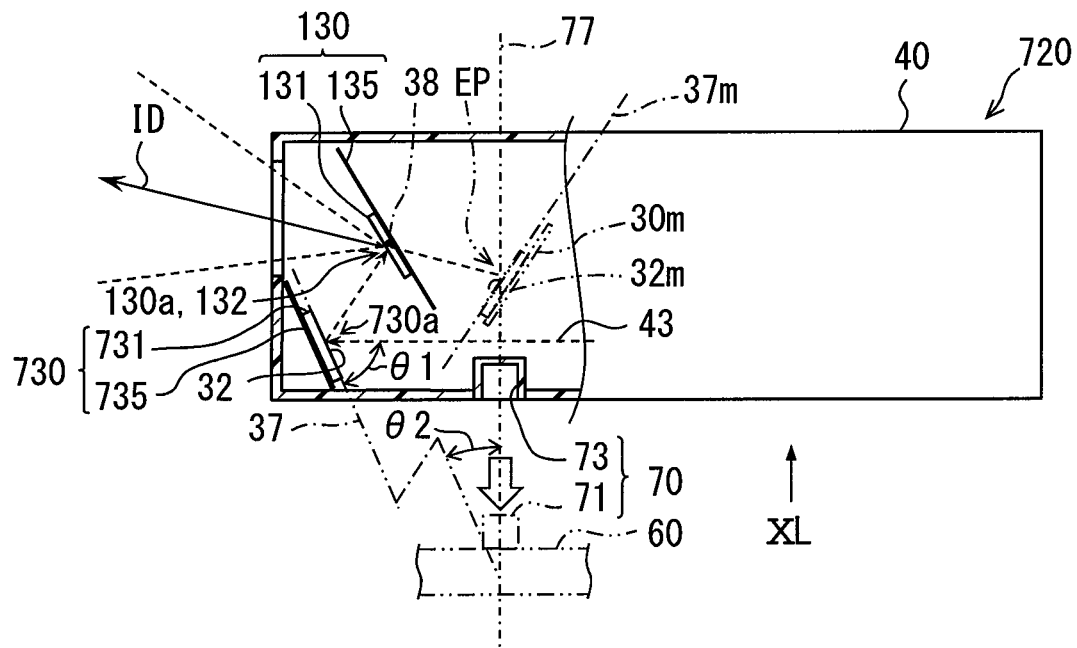
FIG. 39 is a right side view of the optical scanning device as viewed in an arrow direction XXXI of FIG. 38.
Figure 40:
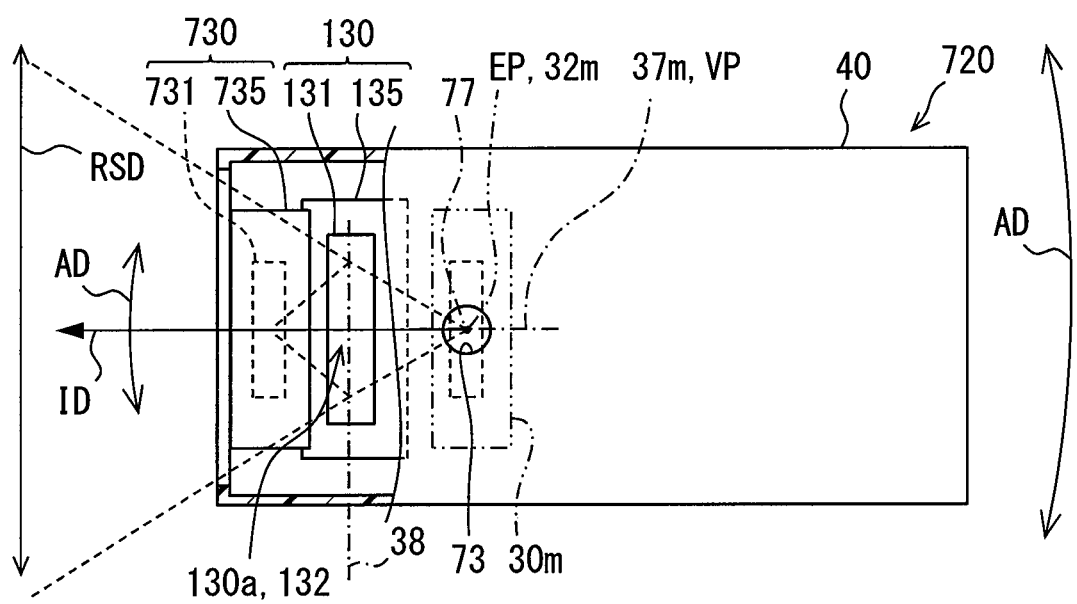
FIG. 40 is a bottom view of the optical scanning device as viewed in an arrow direction XL of FIG. 39.

The seventh embodiment of the present disclosure shown in FIGS. 38 to 40 is still another modification of the first embodiment. The adjustment structure 70 of the seventh embodiment has substantially the same configuration as the first embodiment. The emission direction ID of the optical scanning device 720 can be controlled by the pin hole 73 provided in the scanner housing 40 and the adjustment pin 71 provided in the HUD housing 60. The optical scanning device 720 includes a first scanner unit 730 and a second scanner unit 130 in place of the scanner unit 30 (see FIG. 6). The first scanner unit 730 and the second scanner unit 130 are held by the scanner housing 40.

The first scanner unit 730 includes the MEMS chip 731 and the circuit board 735. A virtual resonant scanning axis 37 is defined in the MEMS chip 731. The MEMS chip 731 causes the mirror portion 32 to resonate and oscillate under the control of the controller 45 (see FIG. 2). The laser light emitted from the laser light source 44 (see FIG. 2) is incident on the mirror portion 32. The mirror portion 32 reflects the laser light toward the second scanner unit 130. The first scanner unit 730 causes the mirror portion 32 that resonates and oscillates about the resonant scanning axis 37 to function as a resonant scanning scanner 730a.

The second scanner unit 130 includes the MEMS chip 131 and the circuit board 135. A virtual forced scanning axis 38 is defined in the MEMS chip 131. The MEMS chip 131 forcibly oscillates the mirror portion 132 under the control of the controller 45 (see FIG. 2). The laser light reflected by the first scanner unit 730 is incident on the mirror portion 132. The mirror portion 132 reflects the incident laser light toward the outside of the scanner housing 40. The second scanner unit 130 causes the mirror portion 132 oscillating about the forced scanning axis 38 to function as a forced scanning scanner 130a.

In the above configuration, the laser light scans the display area 51 in the x-axis (horizontal) direction by the resonant oscillation of the mirror portion 32. Further, the laser light scans the display area 51 in the y-axis (vertical) direction by the forced oscillation of the mirror portion 132. Thus, the optical scanning device 720 causes the resonant scanning scanner 730a and the forced scanning scanner 130a to cooperate, and draws the display image 11 in the display area 51 by the scanning of the two scanners 730a and 130a (see FIG. 2).

The mirror portion 132 of the second scanner unit 130 defines the position of the mirror image 30m of the first scanner unit 730 and the position of the mirror image 37m of the resonant scanning axis 37. The mirror image 30m is a virtual image of the first scanner unit 730 reflected by the mirror portion 132 in the stationary state. The mirror image 37m is a virtual image of the resonant scanning axis 37 reflected by the mirror portion 132 in the stationary state. The virtual exit pupil EP of the optical scanning device 720 is at a position corresponding to the center of the mirror portion 32 in the mirror image 30m of the first scanner unit 730.

The adjustment structure 70 can control the emission direction ID of the laser light emitted from the scanner housing 40 at least around the mirror image 37m of the resonant scanning axis 37 by the relative rotation of the scanner housing 40 with respect to the HUD housing 60. The adjustment axis 77 of the adjustment structure 70 intersects the mirror image 30m of the first scanner unit 730. More specifically, the adjustment axis 77 intersects the mirror image 32m of the mirror portion 32 of the MEMS chip 731 and passes through the exit pupil EP of the optical scanning device 720.

In the seventh embodiment, the resonant scanning scanner 730a and the forced scanning scanner 130a are separately provided, and the resonant scanning scanner 730a is arranged between the laser light source 44 (see FIG. 2) and the forced scanning scanner 130a. In such a configuration, the adjustment axis 77 is set to intersect the mirror image 30m of the first scanner unit 730 defined by the mirror portion 132 of the forced scanning scanner 130a. Accordingly, while the emission direction ID is adjusted by the rotation of the scanner housing 40 in the adjustment direction AD, the position of the exit pupil EP does not substantially move. Therefore, in the seventh embodiment, it is possible to suppress the decrease in luminance of the virtual image 10 by narrowing the scanning angle of the resonant scanning scanner 730a while maintaining the visible range of the virtual image 10 (see FIG. 1).

In the seventh embodiment, when the resonant scanning axis 37, the optical axis 43, and the adjustment axis 77 are viewed in the direction perpendicular to the virtual plane VP, the inclination angle θ2 of the adjustment axis 77 with respect to the resonant scanning axis 37 is smaller than the inclination angle θ1 of the optical axis 43 with respect to the resonant scanning axis 37. Accordingly, the inclination of the mirror image 30m with respect to the adjustment axis 77 can be made smaller. Therefore, the rotation around the adjustment axis 77 is likely to be reflected in the adjustment of the emission direction ID in the resonant scanning direction RSD. In the seventh embodiment, the mirror portion 132 corresponds to a reflective optical element. The MEMS chip 731 corresponds to a scanner chip. The resonant scanning scanner 730a corresponds to a scanner.

Other Embodiments

The embodiments have been described above, however, the present disclosure is not construed as being limited to the embodiments. The present disclosure can be applied to various embodiments and combinations within a scope that does not depart from the spirit of the present disclosure.

Figure 41:
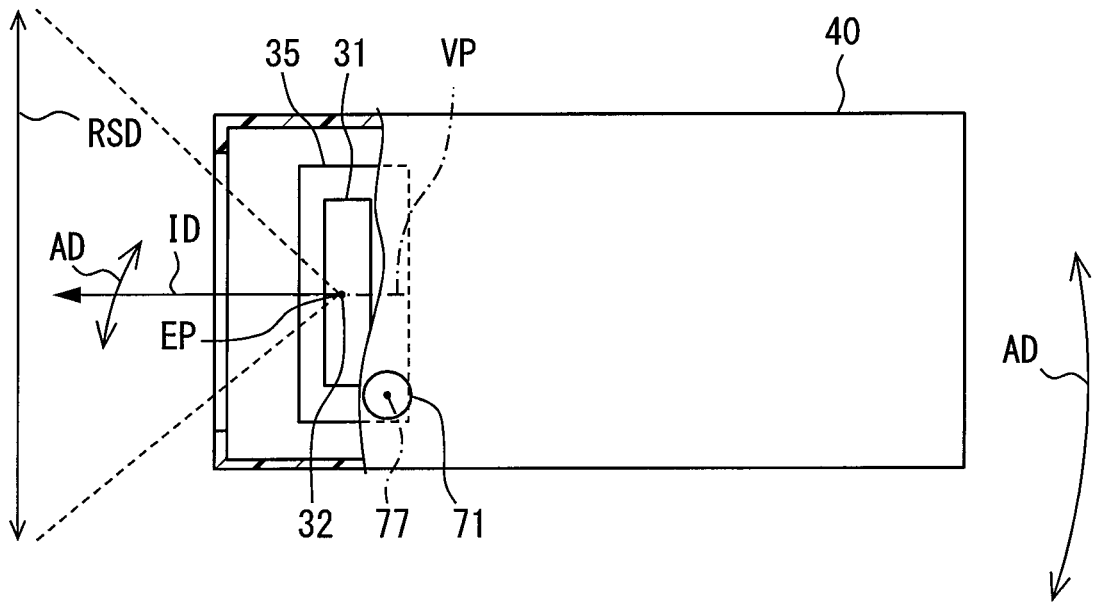
FIG. 41 is a bottom view illustrating a first modification.
Figure 42:
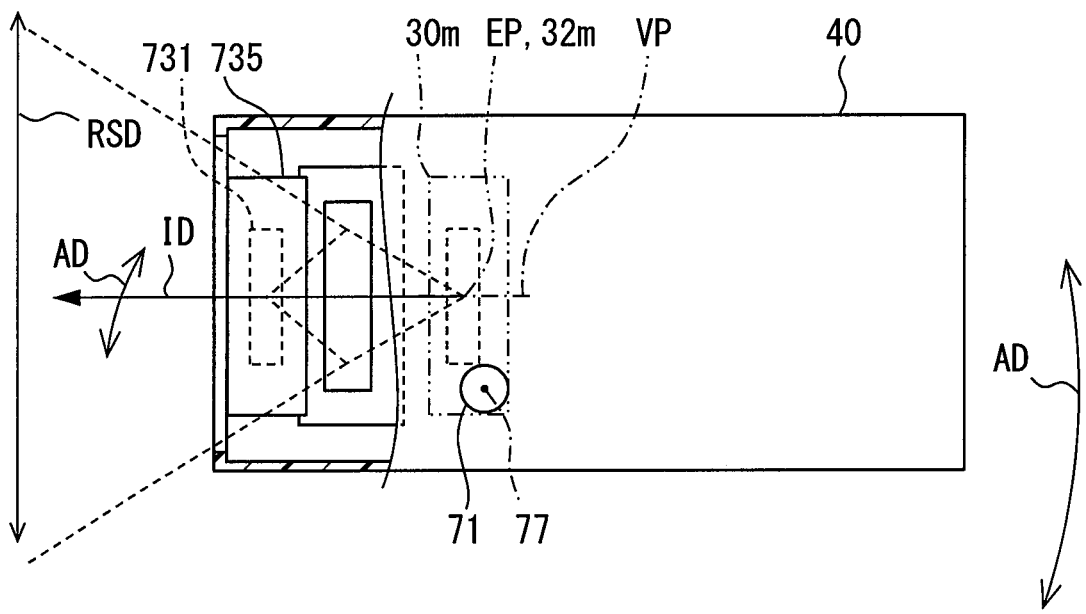
FIG. 42 is a bottom view illustrating a second modification.

In the first modification of the third embodiment, as shown in FIG. 41, the adjustment axis 77 which is the central axis of the adjustment pin 71 does not pass through the center of the mirror portion 32 which is the exit pupil EP. The adjustment axis 77 intersects the circuit board 35 in an area outside of the MEMS chip 31. Further, in the second modification of the seventh embodiment, as shown in FIG. 42, the adjustment axis 77, which is the central axis of the adjustment pin 71, does not pass through the center of the mirror image 32m of the mirror portion 32 corresponding to the exit pupil EP. The adjustment axis 77 intersects the mirror image 30m of the circuit board 735 outside the area where the MEMS chip 731 is mounted.

As described in the first and second modifications, the adjustment axis 77 does not have to pass exactly through the exit pupil EP, while passing through a space around the exit pupil EP, for example, about 30 mm in radius about the exit pupil EP. As an example, the relative position of the adjustment axis and the resonant scanning axis is set in such a positional relationship that the movement of the eye box EB falls within 13 mm or less when the emission direction ID is moved by α°. Specifically, the adjustment axis 77 may intersect the MEMS chip 31 in a region other than the mirror portion 32. Alternatively, the adjustment axis 77 may intersect the mirror image 30m of the MEMS chip 731 in a region other than the mirror image 32m of the mirror portion 32 (see FIG. 39). With such a configuration, even while the scanner housing 40 is rotated about the adjustment axis 77 in the adjustment direction AD for adjustment of the emission direction ID, the relative optical position between the exit pupil EP and the screen hardly changes. Thus, the position of the eye box can be suppressed from moving. The adjustment axis 77 is oriented along the virtual plane VP in the first and second modifications.

In the embodiment, the adjustment axis of the adjustment structure is defined to be parallel to the virtual plane VP including the optical axis and the resonant scanning axis. However, the orientations of these axes may not coincide, and may be inclined to each other.

In the above embodiment, the adjustment structure includes the adjustment pin and the pin hole, the adjustment rail and the rail groove, and/or the stepped portions. However, the specific shape, arrangement, number and the like of the adjustment structure can be changed as appropriate.

In the seventh embodiment, the position of the adjustment axis 77 is set based on the mirror image 30m by the mirror portion 132 of the second scanner unit 130 (see FIG. 39). However, in case where an optical scanning device that further reflects the laser light reflected by the scanner to the reflecting mirror to emit the light to the outside of the scanner housing, the position of the adjustment axis is preferably set with reference to the mirror image of the scanner defined by the reflecting mirror. As described above, a "reflective optical element" may be appropriately provided between the scanner and the projection window. In such a configuration, the adjustment axis is set to pass through the mirror image of the scanner by the "reflective optical element". In addition, a "transmission optical element" may be appropriately provided between the scanner and the projection window. In such an arrangement, the adjustment axis is set to pass through the image (virtual image) of the scanner produced by the "transmission optical element".

In the seventh embodiment, the resonant scanning scanner 730a is disposed at a position close to the laser light source (see FIG. 39). However, the resonant scanning scanner 730a may be provided at a position farther from the laser light source than the forced scanning scanner 130a. In this case, the adjustment axis 77 is provided to intersect the resonant scanning scanner 730a. Furthermore, in case where plural resonant scanning axes are defined in the scanner, plural adjustment structures may be provided in the HUD housing and the scanner housing to adjust the emission direction around each of resonant scanning axes.

In the embodiment, the optical scanning device is fixed to the HUD housing by the fastening member such as screw inserted in the long hole. However, the fixing structure for fixing the optical scanning device to the HUD housing may be changed as appropriate. The micro mirror array is adopted as the screen in the embodiment.

However, the configuration of the screen can be changed as appropriate. For example, a micro lens array (MLA) may be employed as a transmissive screen. Alternatively, holographic diffusers and diffuser boards may be employed for the screen. Furthermore, the screen may not be flat, but may be curved so as to correct distortion of the virtual image.

The scanner draws the display image on the screen by the raster scan method in the embodiment. However, the scanning method of the scanner can be changed as appropriate. For example, a display image may be drawn on the screen in a Lissajous scan method. While the scanning method of the scanner is changed, the adjustment structure can adjust the emission direction ID of the laser light.

The scanner unit includes the MEMS chip and the circuit board in the embodiment. As described above, the scanner unit is a unit of components including a scanner and configured separately from the scanner housing. The scanner unit may include a component other than the MEMS chip and the circuit board. Further, the scanner unit may not include the circuit board.

The mobile unit on which the HUD device is mounted may be a ship, an aircraft, a transport device, or the like other than a vehicle. Furthermore, the HUD device may not be mounted on a movable body such as a vehicle. The viewer may not be a driver operating a vehicle. The projection member on which the light of the display image is projected by the HUD device is not limited to the windshield, but may be a combiner or the like disposed above the meter hood. Furthermore, the projection area PA may be formed of a vapor deposition film or a film attached to the windshield WS, for example, for increasing the light reflectance.

The configuration disclosed so far contributes to the improvement of various performances related to the HUD device, in addition to the above-mentioned effects of securing the brightness of the virtual image. For example, the present disclosure improves display quality (such as expressiveness and flexibility) of virtual image, and color-and-position tracking to an object in AR display. The present disclosure widens the viewing area, saves power, and reduces weight, size, and cost. The present disclosure improves the formability and easy assembling at the time of manufacture. Furthermore, the present disclosure contributes to the improvement in workability at the time of installation in a vehicle, maintainability after installation, heat resistance to sunlight, durability to vehicle oscillations and impacts, and dust resistance. The above-described effects are mutually compatible.

What is claimed is:
1. A head-up display device that displays a virtual image for a viewer by projecting light onto a projection member, comprising:
   a screen having a display area to which light is projected to form the virtual image;
   an outer housing that holds the screen;
   a scanner unit having a scanner oscillating about a virtual scanning axis to draw a display image in the display area by scanning of the scanner; and
   a scanner housing held by the outer housing and holding the scanner unit, wherein
   the outer housing and the scanner housing have an adjustment structure to enable an adjustment of an emission direction of light emitted from the scanner housing at least around the scanning axis by a relative rotation of the scanner housing with respect to the outer housing about a virtual adjustment axis, and
   the virtual adjustment axis intersects the scanner unit.
2. The head-up display device according to claim 1, wherein
   the scanner unit includes a scanner chip which has a mirror portion that oscillates around the scanning axis as the scanner, and
   the adjustment axis intersects the scanner chip.
3. The head-up display device according to claim 2, wherein the adjustment axis intersects the mirror portion.
4. The head-up display device according to claim 1, wherein
   the scanner unit includes
      a scanner chip which has a mirror portion that oscillates around the scanning axis as the scanner, and
      a circuit board on which the scanner chip is mounted, and
   the adjustment axis intersects the circuit board within an area outside of the scanner chip.
5. A head-up display device that displays a virtual image for a viewer by projecting light onto a projection member, comprising:
   a screen having a display area to which light is projected to form the virtual image;
   an outer housing that holds the screen;
   a scanner unit having a scanner oscillating about a virtual scanning axis to draw a display image in the display area by scanning of the scanner;
   a scanner housing held by the outer housing and holding the scanner unit; and
   a reflective optical element held by the scanner housing to reflect light incident from the scanner toward outside of the scanner housing, the reflective optical element defining a position of each mirror image of the scanner unit and the scanning axis, wherein
   the outer housing and the scanner housing have an adjustment structure to enable an adjustment of an emission direction of light emitted from the scanner housing at least around a mirror image of the scanning axis by a relative rotation of the scanner housing with respect to the outer housing about a virtual adjustment axis, and
   the virtual adjustment axis intersects a mirror image of the scanner unit.
6. The head-up display device according to claim 5, wherein
   the scanner unit includes a scanner chip which has a mirror portion that oscillates around the scanning axis as the scanner, and
   the adjustment axis intersects a mirror image of the scanner chip.

7. The head-up display device according to claim 6, wherein the adjustment axis intersects a mirror image of the mirror portion.

8. The head-up display device according to claim 5, wherein
the scanner unit includes
a scanner chip which has a mirror portion that oscillates around the scanning axis as the scanner, and
a circuit board on which the scanner chip is mounted, and
the adjustment axis intersects a mirror image of the circuit board within an area outside of the scanner chip.

9. The head-up according to claim 1, further comprising:
a light source to emit light incident on the scanner, wherein
the adjustment axis is oriented along a virtual plane including an optical axis of light incident on the scanner and the scanning axis.

10. The head-up display device according to claim 9, wherein
an inclination angle of the adjustment axis with respect to the scanning axis is smaller than an inclination angle of the optical axis with respect to the scanning axis, when the scanning axis, the optical axis, and the adjustment axis are viewed in a direction perpendicular to the virtual plane.

11. The head-up display device according to claim 1, wherein
the scanner unit draws the display image on the display area by resonant scanning of the scanner, and
the scanning axis is a resonant scanning axis of the scanner.

12. The head-up display device according to claim 1, wherein
the adjustment structure includes a cylindrical portion formed on one of the scanner housing and the outer housing, and a cylindrical hole formed on the other of the scanner housing and the outer housing to fit with the cylindrical portion.

13. The head-up display device according to claim 1, wherein
the adjustment structure includes a rail portion formed on one of the scanner housing and the outer housing, and a rail groove formed on the other of the scanner housing and the outer housing to fit with the rail portion.

\* \* \* \* \*